United States Patent
Kim et al.

(10) Patent No.: US 10,782,851 B2
(45) Date of Patent: Sep. 22, 2020

(54) PORTABLE TERMINAL APPARATUS AND CONTROL METHOD THEREOF

(71) Applicant: SAMSUNG ELECTRONICS CO., LTD., Suwon-si, Gyeonggi-do (KR)

(72) Inventors: Young-jin Kim, Yongin-si (KR); Eun-chan Park, Seoul (KR); Hyun-jae Shin, Seoul (KR); Joon-seop Oh, Yongin-si (KR); Young-min Won, Suwon-si (KR); Sang-ung Yi, Suwon-si (KR); Seung-ho Jung, Suwon-si (KR); Ji-hun Ha, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 224 days.

(21) Appl. No.: 15/212,704

(22) Filed: Jul. 18, 2016

(65) Prior Publication Data
US 2017/0090708 A1    Mar. 30, 2017

(30) Foreign Application Priority Data

Sep. 25, 2015 (KR) .................. 10-2015-0136987

(51) Int. Cl.
*G06F 3/0482* (2013.01)
*H04W 4/50* (2018.01)
(Continued)

(52) U.S. Cl.
CPC ........ *G06F 3/0482* (2013.01); *G06F 3/04817* (2013.01); *G06F 3/04883* (2013.01); *H04B 1/3827* (2013.01); *H04W 4/50* (2018.02)

(58) Field of Classification Search
CPC .. G06F 3/0484; G06F 3/04817; G06F 3/0482; G06F 3/04883; H04L 67/12; H04W 4/50; H04B 1/3827
See application file for complete search history.

(56) References Cited

U.S. PATENT DOCUMENTS 7,271,734 B2 *  9/2007  Sata ............... H04N 5/44543
                                                340/12.54
9,413,827 B2 *  8/2016  Sharma ............... H04L 67/12
(Continued)

FOREIGN PATENT DOCUMENTS

CN      104571024 A      4/2015
JP      2013-090141      5/2013
(Continued)

OTHER PUBLICATIONS

Search Report and Written Opinion dated Nov. 7, 2016 in counterpart International Patent Application No. PCT/KR2016/007979.
(Continued)

*Primary Examiner* — Andrew L Tank
(74) *Attorney, Agent, or Firm* — Nixon & Vanderhye P.C.

(57) ABSTRACT

Provided herein is a portable terminal apparatus and a control method thereof, the method including registering at least one execution condition and execution command in the portable terminal apparatus; displaying an icon for the control; and in response to a select command regarding the icon being input, transmitting an execution command corresponding to an execution condition at a point where the select command regarding the icon is input to at least one peripheral device.

18 Claims, 16 Drawing Sheets

(51) Int. Cl.
*G06F 3/0481* (2013.01)
*G06F 3/0488* (2013.01)
*H04B 1/3827* (2015.01)

(56) References Cited

U.S. PATENT DOCUMENTS

| | | | |
|---|---|---|---|
| 9,454,251 B1* | 9/2016 | Guihot | G08C 17/02 |
| 9,582,139 B1* | 2/2017 | Tseng | G06F 3/04812 |
| 9,853,826 B2* | 12/2017 | Shuman | H04L 67/16 |
| 2003/0098892 A1* | 5/2003 | Hiipakka | G06F 3/0481 |
| | | | 715/846 |
| 2010/0138764 A1* | 6/2010 | Hatambeiki | G08C 17/02 |
| | | | 715/765 |
| 2011/0138459 A1 | 6/2011 | Bae et al. | |
| 2014/0059483 A1 | 2/2014 | Mairs et al. | |
| 2014/0094972 A1 | 4/2014 | Matsuoka et al. | |
| 2014/0108943 A1 | 4/2014 | Lee et al. | |
| 2014/0355588 A1 | 12/2014 | Cho et al. | |
| 2015/0072674 A1 | 3/2015 | Shoemaker et al. | |
| 2015/0087278 A1 | 3/2015 | Kim et al. | |
| 2015/0195365 A1 | 7/2015 | Choi et al. | |
| 2015/0243161 A1* | 8/2015 | Hayes | G08C 17/02 |
| | | | 340/12.25 |
| 2017/0214784 A1* | 7/2017 | Masuoka | H04M 1/72533 |

FOREIGN PATENT DOCUMENTS

| | | |
|---|---|---|
| KR | 10-0763175 | 10/2007 |
| KR | 10-2008-0081517 | 9/2008 |
| KR | 10-2014-0141747 | 12/2014 |

OTHER PUBLICATIONS

Extended EP Search Report dated May 24, 2018 for EP Application No. 16848781.7.

Chinese Office Action dated Jun. 3, 2020 for Chinese Application No. 201610851587.6.

India Office Action dated May 19, 2020 for India Application No. 201817011122.

\* cited by examiner

FIG. 3A
FIG. 3B
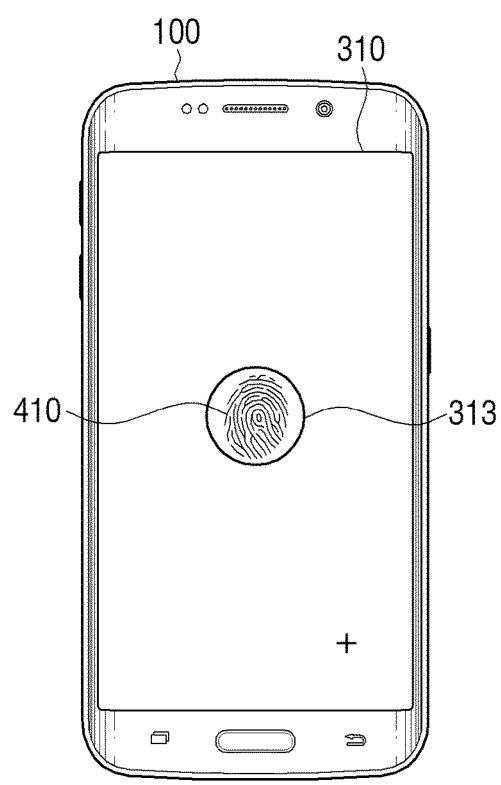
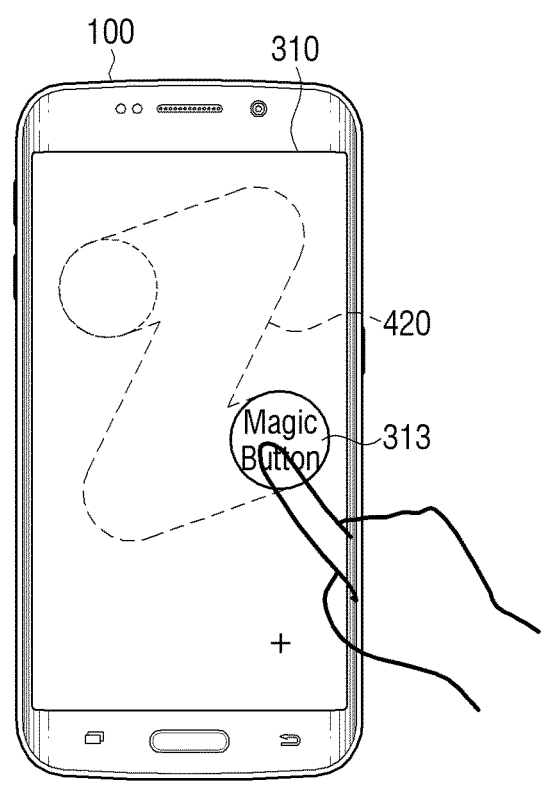

PORTABLE TERMINAL APPARATUS AND CONTROL METHOD THEREOF

CROSS-REFERENCE TO RELATED APPLICATION

This application is based on and claims priority under 35 U.S.C. § 119 to Korean Patent Application No. 10-2015-0136987 filed in the Korean Intellectual Property Office on Sep. 25, 2015, the disclosure of which is incorporated by reference herein in its entirety.

BACKGROUND

1. Field

Methods and apparatuses of the disclosure relate generally to a portable terminal apparatus and control method thereof, and for example, to a portable terminal apparatus for providing IoT services, and a control method thereof

2. Description of Prior Art

As Internet communication technologies develop in recent days, people are becoming increasingly interested in IoT (Interest of Things) services for providing information between electronic devices through wireless and wired internet and providing automated services based on those information provided between electronic devices, and thus research on IoT services is being actively conducted.

Therefore, recently developed or published electronic devices provide communication modules, platforms, and service functions for IoT internet services so that information may be shared between electronic devices.

Meanwhile, conventional IoT services are provided in a format implemented according to different automated service rules pre-defined by manufacturers. Accordingly, there occurs a problem that a user has to be aware of the information related to automated service rules defined by each manufacturer.

In order to improve this problem, people are seeking ways to provide IoT services through automated service rules set per user, but since the steps for generating such automated service rules are complex, there is a problem that IoT services cannot be used more efficiently.

SUMMARY

The disclosure addresses the aforementioned problems of prior art, that is to allow IoT services to be used more efficiently.

Furthermore, to the disclosure provides methods and apparatuses to allow registration settings related to IoT services to be performed more easily and rapidly.

According to an example embodiment of the disclosure, a control method for a portable terminal apparatus is provided, the method including registering at least one execution condition and execution command in the portable terminal device; displaying an icon for the control on the portable terminal device; and in response to receiving a select command regarding the icon, transmitting an execution command, the execution command corresponding to an execution condition at a point where the select command regarding the icon is input, to at least one peripheral device.

The registering may include registering the at least one execution condition and execution command by category, and the category may include at least one of a time base, location base, time and location base, peripheral device base, body information base and weather base.

The method may further include collecting context information that includes at least one of current time information, location information of the portable terminal apparatus, information on communication with the at least one peripheral device, body information and weather information, wherein the transmitting an execution command includes extracting the execution condition of the at least one execution condition registered by category based on the context information collected at the point where the select command regarding the icon was input, and transmitting the execution command corresponding to the extracted execution condition to the peripheral device that performs operations based on the extracted execution condition.

The method may further include collecting context information that includes at least one of current time information, location information of the portable terminal apparatus, information on communication with the at least one peripheral device, body information and weather information, and extracting at least one execution condition of the execution conditions registered by category using the context information, wherein the displaying includes displaying the icon in response to the execution condition being extracted.

The transmitting may include, in response to a first execution condition of the execution conditions registered in a first category being extracted, transmitting an execution command corresponding to the first execution condition to a peripheral device that performs operations based on the first execution condition, and in response to a first and second execution condition of the execution conditions registered in the first category being extracted, transmitting each execution command corresponding to the first and second execution condition to a peripheral device that performs operations based on the first and second execution condition.

The transmitting may include, in response to an execution condition registered in the first category and an execution condition registered in the second category being extracted, transmitting an execution command corresponding to each execution condition to a peripheral device that performs operations based on each execution condition extracted in the first and second category.

The icon may be being displayed on a lock screen of the portable terminal apparatus.

The method may further include, in response to a predetermined command regarding the icon being input, displaying a sub icon corresponding to at least one execution condition executable at a point where the command was input, and the transmitting may include, in response to a select command regarding the sub icon displayed being input, transmitting an execution command corresponding to an execution condition at the point where the select command regarding the sub icon was input to the at least one peripheral device.

The method may further include in response to a select command regarding the icon being input, performing a user certification based on the select command, wherein the user certification is at least one of a user fingerprint and a touch input pattern.

The registering may include displaying a registration UI screen for registering an IoT service based on a user command; receiving an input of a select command regarding at least one of an icon corresponding to each category included in the registration UI screen; in response to the at least one icon being selected, receiving an input of an execution condition and execution command; and registering the input execution condition and execution command in a category corresponding to the selected icon.

According to another example embodiment of the disclosure, a portable terminal apparatus is provided including communication circuitry configured to perform data communication with at least one peripheral device; a storage configured to store at least one pre-registered execution condition and execution command; a display configured to display an icon; input circuitry configured to receive an input of a select command regarding the icon; and processing circuitry configured to, in response to the select command regarding the icon being input through the input circuitry, control the communication circuitry to transmit an execution command corresponding to an execution condition at a point where the select command the icon is input to the at least one peripheral device.

The at least one execution condition and execution command may be registered by category, and the category may include at least one of a time base, location base, time and location base, peripheral device base, body information base and weather base.

The processing circuitry may be configured to control the communication circuitry to extract at least one execution condition of a plurality of execution conditions registered by category based on context information collected at the point where the select command regarding the icon is input, and to transmit the execution command corresponding to the extracted execution condition to the peripheral device that performs operations based on the extracted execution condition, and the context information may include at least one of current time information, location information of the portable terminal apparatus, information on communication with the at least one peripheral device, body information and weather information.

The processing circuitry may be configured to control the display to collect the context information in real time, to extract at least one execution condition of the execution conditions registered by category using the collected context information, and, in response to the at least one execution condition being extracted, to display the icon, and the context information may include at least one of current time information, location information of the portable terminal apparatus, information on communication with the at least one peripheral device, body information and weather information.

The processing circuitry may be configured to control the communication circuitry to, in response to a first execution condition of the execution conditions registered in a first category being extracted, transmit an execution command corresponding to the first execution condition to a peripheral device that performs operations based on the first execution condition, and in response to a first and second execution condition of the execution conditions registered in the first category being extracted, transmit each execution command corresponding to the first and second execution condition to a peripheral device that performs operations based on the first and second execution condition.

The processing circuitry may be configured to control the communication circuitry to, in response to an execution condition registered in the first category and an execution condition registered in the second category being extracted, transmit an execution command corresponding to each execution condition to a peripheral device that performs operations based on each execution condition extracted in the first and second category.

The icon may be being displayed on a lock screen of the portable terminal apparatus.

The processing circuitry may be configured to control the display to, in response to a predetermined user command regarding the icon being input, display a sub icon corresponding to at least one execution condition executable at a point where the user command is input, and to control the communication circuitry to, in response to a select command regarding the sub icon displayed being input, transmit an execution command corresponding to an execution condition at the point where the select command regarding the sub icon is input to the at least one peripheral device.

The processing circuitry, in response to a select command regarding the icon being input, may be configured to perform a user certification based on the select command, and the user certification may be at least one of a user fingerprint and a touch input pattern.

The display may be configured to display a registration UI screen for registering an IoT service based on a command; and the processing circuitry, in response to the at least one icon corresponding to each category included in the registration UI screen being selected and receiving an input of an execution condition and execution command, may be configured to register the input execution condition and execution command in a category corresponding to the selected icon and stores the same in the storage.

As mentioned above, according to the disclosure, a portable terminal apparatus may provide a more easy and fast IoT service.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIGS. 3A and 3B are diagrams illustrating an example of performing a user certification in a portable terminal apparatus;

DETAILED DESCRIPTION

Figure 1:
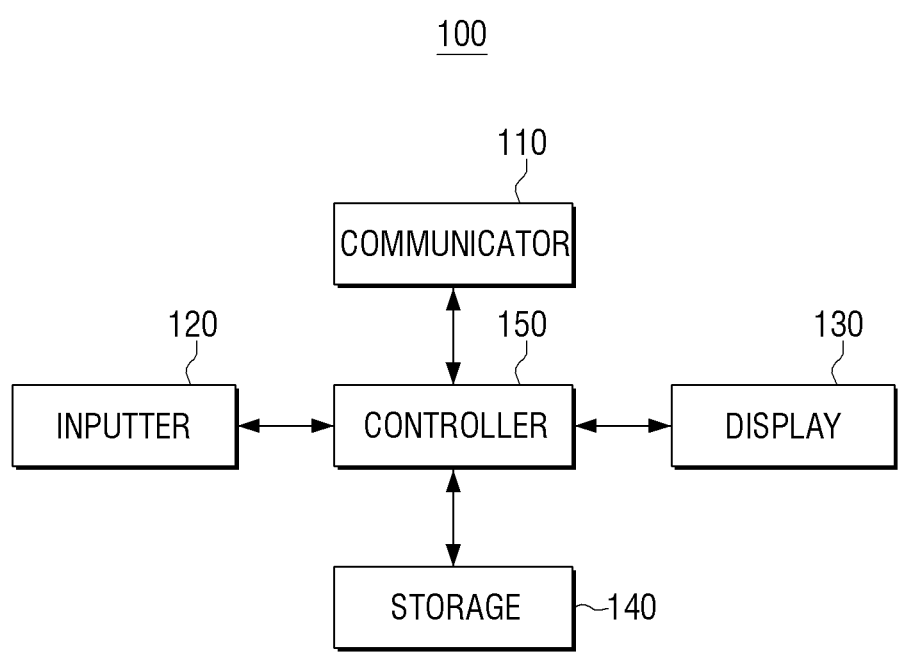
FIG. 1 is a block diagram schematically illustrating an example portable terminal apparatus that provides IoT services.

Prior to explaining the disclosure in greater detail with respect to various example embodiments below, the manner of disclosing the example embodiments and the drawings will be explained below.

The words used in the disclosure and in the claims are selected from generally used terms in consideration of the functions of various example embodiments of the disclosure. However, the meanings of these words may vary depending on the intentions of one skilled in the art, technical interpretation, and advent of a new technology. Furthermore, some of the words herein may have been randomly or arbitrarily selected. These words may be interpreted as defined in this disclosure, and unless there are specific definitions, they may be interpreted based on the overall disclosure and the general technical common sense of one skilled in the art.

Furthermore, like reference numerals in the drawings refer to like parts or components that perform substantially the same functions. For ease understanding an explanation, like reference numerals may be used in different embodiments as well. For example, even if like reference numerals are used in a plurality of drawings, it does not necessarily mean that all the drawings belong to the same example embodiment.

Furthermore, words that include ordinal numerals such as "the first" and "the second" may be used to differentiate between the components in this disclosure and in the claims. These ordinal numerals are used to differentiate between the same or similar components, and thus the use of such ordinal numerals is not intended to limit the meanings of the words. For example, the order of use or order of arrangement of a component combined with such an ordinal numeral shall not be limited by that ordinal numeral. When necessary, the ordinal numerals may be exchanged between one another.

Unless mentioned otherwise, any singular expression includes a plural expression. In the disclosure, words such as "include" or "consist of" are used to designate that the characteristics, numbers, steps, operations, components, parts or a combination thereof disclosed in the present specification exist, but not to exclude the possibility of existence or addition of one or more of other characteristics, numbers, steps, operations, components, parts or a combination thereof.

Words such as "module", "unit", and "part" are used to indicate a component that performs one or more functions or operations, and such a component may be realized in a software, firmware or hardware (e.g., circuitry), or as a combination thereof. Furthermore, a plurality of "modules", "units" and "parts" may be integrated into at least one module or chip and thus be realized in at least one processor (not illustrated) besides the cases where each of them has to be realized in certain hardware.

Furthermore, in an example embodiment of the disclosure, a part being connected to another part includes the part being connected to the another part indirectly via another medium. Furthermore, a part including another component may include any other component that may be further included unless mentioned otherwise.

Hereinafter, various example embodiments of the disclosure will be described with reference to the attached drawings.

Figure 2:
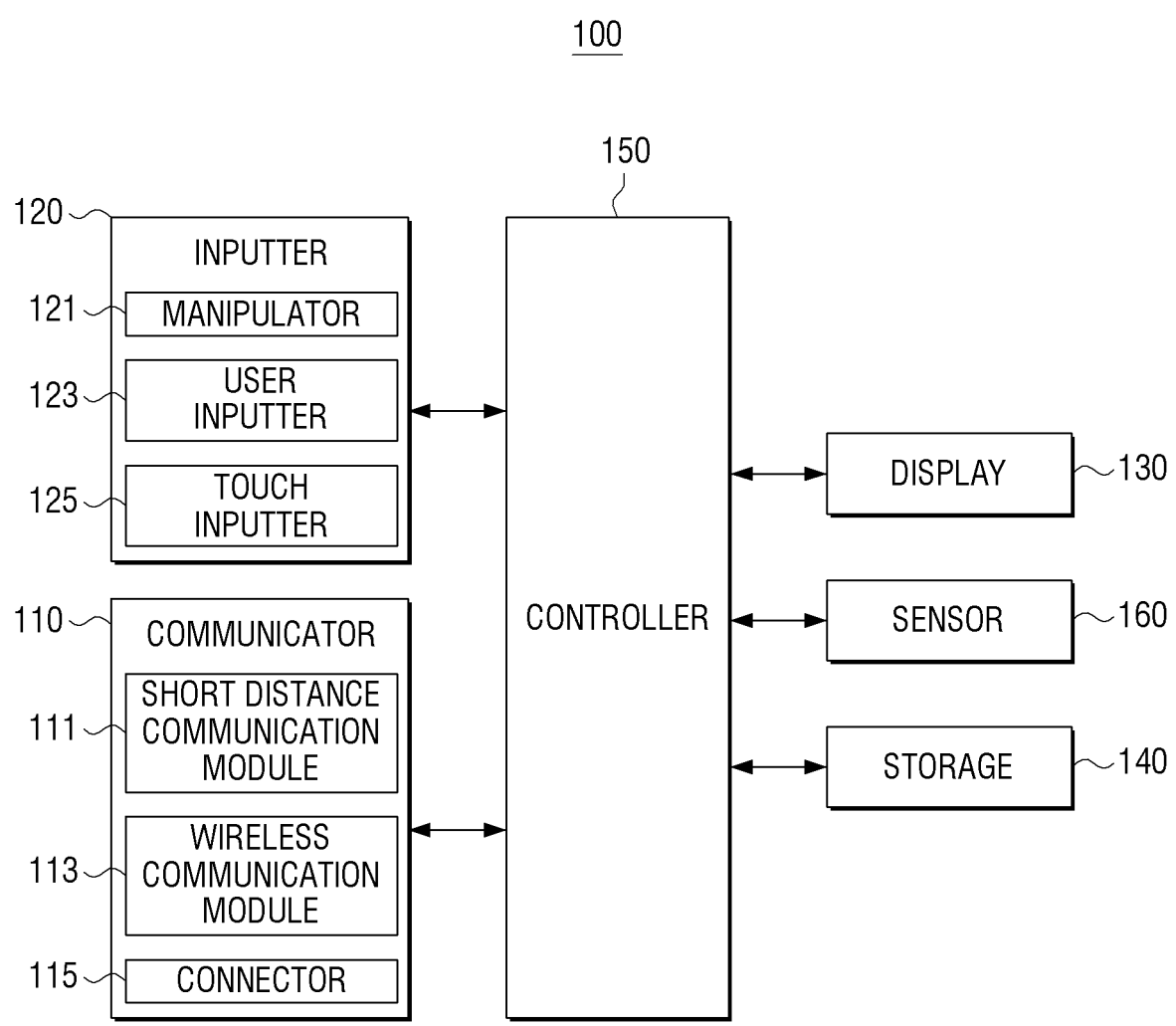
FIG. 2 is a block diagram illustrating an example portable terminal apparatus that provides IoT services.

FIG. 1 is a block diagram illustrating an example portable terminal apparatus that provides IoT services, and FIG. 2 is a block diagram illustrating an example portable terminal apparatus that provides IoT services.

As illustrated in FIG. 1, the portable terminal apparatus 100 may, for example, be a terminal apparatus such as a smart phone and tablet PC configured to perform wireless communication, or the like. The portable terminal apparatus 100 may, for example, be an apparatus that performs data communication with at least one peripheral device (not illustrated) and provides IoT (Internet of Things) services. Such a portable terminal apparatus 100 may include a communicator (e.g., including communication circuitry) 110, inputter (e.g., including input circuitry) 120, display (e.g., including a display panel) 130, storage 140, and controller (e.g., including processing circuitry) 150. As referenced above, various elements of the portable apparatus may include circuitry, hardware, firmware and/or software or any combination thereof for performing the functions of the various elements. For example, and without limitation, the communicator may include communication circuitry including, for example, various communication chips, the inputter may include input circuitry including, for example, physical keys, virtual keys, touch input apparatus, or the like, the display may include display driving circuitry, a display panel, etc. for realizing a display, and the controller may include various processing circuitry, including, for example, at least one processor having one or more processing cores. For ease and convenience of explanation, terms such as controller, inputter, display, communicator, etc. may be used in the following description. However, it will be understood that such terms are merely shorthand for elements that may include various hardware, software and/ or firmware or any combination thereof.

The communicator 110 performs data communication with at least one peripheral device (not illustrated). The at least one peripheral device (not illustrated) may, for example, be an apparatus that performs operations based on an execution command corresponding to an execution condition registered for IoT services. Such a peripheral device (not illustrated) may, for example, be one of a variety of electronic apparatuses including not only home appliances provided at home such as an air conditioner, refrigerator, and washing machine, or the like, but also those that can be used in a peripheral living environment.

As illustrated in FIG. 2, such a communicator 110 may include a connector 115 and at least one of a wireless communication module such as a short distance communication module 111 and wireless LAN module 113, and a wired communication module such as an HDMI (High-Definition Multimedia Interface), USB (Universal Serial Bus), and IEEE (Institute of Electrical and Electronics Engineers) 1394.

The short distance communication module 111 may be a component configured to perform short distance communication wirelessly between the portable terminal apparatus 100 and an electronic apparatus 200. Such a short distance communication module 111 may include, for example, at least one of a bluetooth module, IrDA (infrared data association) module, NFC (Near Field Communication) module, WiFi module, and Zigbee module or the like.

Furthermore, the wireless communication module 113 may be a module configured to be connected to an external network according to a wireless communication protocol such as IEEE to perform communication. The wireless communication module may further include, for example, a mobile communication module configured to be connected to a mobile communication network according to various mobile communication standards such as 3G (3rd Generation), 3GPP (3rd Generation Partnership Project), and LTE (Long Term Evolution), or the like, to perform communication.

As mentioned above, the communicator 110 may, for example, be realized in various short distance communication methods, and when necessary, other communication techniques not mentioned in this disclosure may also be adopted.

The connector 115 may, for example, be a component such as a USB 2.0, USB 3.0, HDMI, and IEEE 1394, or the like, for providing an interface with various source apparatuses. Such a connector 115 may, for example, receive contents data transmitted from an external server (not illustrated) through a wired cable connected to the connector 115 based on a control command of the controller 130 that will be explained in greater detail below or transmit pre-stored contents data to an external recording medium. The connector 115 may, for example, receive input of power from a power source through a wired cable physically connected to the connector 115.

The inputter 120 may, for example, include an input means for receiving various user commands and transmitting the received user commands to the controller 150 that will be explained in greater detail below. As illustrated in FIG. 2, the inputter 120 may include a manipulator 121, user inputter 123, and touch inputter 125.

The manipulator 121 may, for example, be realized as a key pad provided with various function keys, number keys, and character keys, and in the case where the display 130 that will be explained below is realized in a touch screen format, the touch inputter 125 may be realized as a touch pad configured in a mutual layered structure with the display 130. The touch inputter 125 may receive input of a select command regarding an icon related to an IoT service displayed through the display 130 that will be explained in greater detail below. However, there is no limitation thereto, and thus the inputter 120 may receive input of a command related to an IoT service through the manipulator 121.

The user inputter 123 may, for example, receive input of an IR signal or RF signal from at least one peripheral device (not illustrated). The controller 150 that will be explained in greater detail below may register a location of the at least one peripheral device (not illustrated) or determine a distance between the portable terminal apparatus 100 and the peripheral device (not illustrated) through the IR signal or RF signal input through the user inputter 123. The user inputter 123 may, for example, receive a control signal for controlling operations of the portable terminal apparatus 100 or a voice signal from a peripheral device (not illustrated) such as a remote control apparatus (not illustrated). The user inputter 123 may, for example, receive input of a control signal regarding a user command related to an IoT service from a peripheral device (not illustrated) such as a smart watch (not illustrated), as mentioned above.

The display 130 displays, for example, an icon for IoT services. The icon displayed through the display 130 may, for example, be an icon configured to receive input of a user command for registering or executing an IoT service. An icon for registering an IoT service may, for example, be referred to herein as a registration icon, and an icon for executing an IoT service may, for example, be referred to herein as a magic icon.

The display 130 may, for example, display contents received from an external server such as a contents server (not illustrated) or pre-stored contents related data, or display various UI screens for controlling operations of the portable terminal apparatus 100.

Such a display 130 may, for example, be realized as an LCD (Liquid Crystal Display), OLED (Organic Light Emitting Display), or PDP (Plasma Display Panel) and the like. The display 130 may be realized in a touch screen format having a mutual layered structure with the touch inputter 125.

The storage 140 stores, for example, at least one execution condition and execution command registered by pre-stored category with respect to IoT services. The pre-stored category may include, for example, at least one of a time base, location base, time and location base, peripheral device base, body information base, and weather base.

The storage 140 may, for example, store an operation program for controlling operations of the portable terminal apparatus 100. The operation program may, for example, be a program that is read by the storage 140, compiled and then operates each configuration of the portable terminal apparatus 100 when the portable terminal apparatus 100 is turned on. Such a storage 140 may be realized as at least one of a ROM, RAM, memory card (for example, SD card, memory stick) that may be attached/mounted to the portable terminal apparatus 100, nonvolatile memory, volatile memory, HDD (Hard Disk Drive), and SSD (Solid State Drive).

The controller (e.g., including processing circuitry) 150 may, for example, be a controlling apparatus configured to control the overall operations of the portable terminal apparatus 100, or a processing apparatus configured to allow the overall operations of the portable terminal apparatus 100 to be controlled. Such a controller 130 may be also used as, for example, a CPU or microprocessor, and may also copy various programs stored in the storage 140 to the RAM, and execute the programs copied in the RAM to perform various operations. Such a controller 130 may be combined with the aforementioned communicator 110, inputter 120 and sensor 160 that will be explained in greater detail below and may be realized as an SOC (System-on-a-chip) or SoC (System on chip).

In response to a select command regarding a magic button icon related to execution of an IoT service being input through the inputter 120, such a controller 150 may be configured to control the communicator 110 to transmit an execution command corresponding to an execution condition at a point where the select command regarding the magic button icon was input to at least one peripheral device.

In an example embodiment, the controller 150 may be configured to extract at least one execution condition from among a plurality of execution conditions registered by category based on context information collected at the point where the select command regarding the magic button icon was input. The context information may include, for example, at least one of current time information, location information of the portable terminal apparatus 100, information on state of communication with the at least one peripheral device (not illustrated), body information and weather information.

In response to at least one execution condition being extracted based on such context information, the controller 150 may be configured to control the communicator 110 to transmit an execution command corresponding to the extracted execution condition to a peripheral device (not illustrated) that performs operations of the extracted execution condition. Accordingly, the communicator 110 may be configured to transmit the execution command corresponding to the execution condition to the peripheral device (not illustrated) that performs operations based on the execution condition at the point where the select command regarding the magic button was input.

For example, in response to a select command regarding the magic button icon being input, the controller 150 may be configured to collect context information that includes at least one of current time information, location information of the portable terminal apparatus 100, information on state of communication with the at least one peripheral device (not illustrated), body information, and weather information. The controller 150 may be configure to extract an execution condition related to the collected context information from among a plurality of execution conditions registered by category in the storage 140.

For example, a time related execution condition, '7~8 o'clock am', and an execution command for performing an operation of turning on a bathroom light in a lighting apparatus (not illustrated) and for performing an operation of turning on a boiler for hot water in a boiler apparatus (not illustrated) may be registered in the time base category.

With such an execution condition registered, when it is determined that context information related to current time information collected at a point where a select command regarding the magic button icon was input is related to the execution condition, the controller 150 may be configured to extract the execution condition registered in the time base category. The controller 150 may be configured to control the communicator 110 to transmit an execution command to the lighting apparatus (not illustrated) and boiler apparatus (not illustrated) that perform operations based on the extracted execution condition.

The communicator 110 may be configured to transmit the execution command to the lighting apparatus (not illustrated) and boiler apparatus (not illustrated), and the lighting apparatus (not illustrated) and boiler apparatus (not illustrated) may turn on the bathroom lights and turn on the boiler hot water based on the execution command received from the portable terminal apparatus 100.

In an example embodiment, the controller 150 may be configured to collect context information in real time, and to extract at least one execution condition from among execution conditions registered by category using the collected context information. As mentioned above, the context information may include at least one of current time information, location information of the portable terminal apparatus 100, information on state of communication with at least one peripheral device (not illustrated), body information and weather information.

In response to at least one execution condition being extracted, the controller 150 may be configured to control the display 130 to display the magic button icon for executing an IoT service. Based on such a control command, the display 130 displays the magic button icon.

As mentioned above, the magic button icon may be displayed only when at least one execution related to the context information collected in real time is extracted from among the pre-registered plurality of execution conditions, and thus a user may identify whether or not it is possible to use IoT services at the current situation more intuitively.

In response to a select command regarding the displayed magic button icon being input, the controller 150 may be configured to control the communicator 110 to transmit an execution command corresponding to the extracted execution condition to a peripheral device (not illustrated) that performs operations of the pre-extracted execution condition. The communicator 110 may be configured to transmit an execution command that corresponds to the execution condition to the peripheral device (not illustrated) that performs operations based on the pre-extracted execution condition.

For example, the controller 150 may be configured to collect, in real time, context information that includes, for example, at least one of current time information, location information of the portable terminal apparatus 100, information on state of communication with at least one peripheral device (not illustrated), body information and weather information. The controller 150 may be configured to determine whether or not there is an execution condition related to the collected context information from among the plurality of execution conditions registered and stored by category in the storage 140.

For example, a time related execution condition, '7~8 o'clock am', and an execution command for performing an operation of turning on the bathroom light in a lighting apparatus (not illustrated) and for performing an operation of turning on the boiler for hot water in a boiler apparatus (not illustrated) may be registered in the time base category. With such an execution condition registered, context information related to current time information may be collected. When it is determined that the collected context information is related to the pre-registered execution condition, the controller 150 may be configured to control the display 130 to display the magic button icon for executing an IoT service. Based on such a control command, the display 130 displays the magic button icon.

In response to a select command regarding the displayed magic button icon being input, the controller 150 may be configured to control the communicator 110 to transmit an execution command to the lighting apparatus (not illustrated) and boiler apparatus (not illustrated) that perform operations based on the pre-extracted execution condition.

The communicator 110 may be configured to transmit the execution command to the lighting apparatus (not illustrated) and boiler apparatus (not illustrated), and the lighting apparatus (not illustrated) and boiler apparatus (not illustrated) may turn on the bathroom lights and turn on the boiler hot water based on the execution command received from the portable terminal apparatus 100.

In response to a first execution condition related to pre-collected context information being extracted from among the execution conditions registered in a first category, the controller 150 may be configured to control the communicator 110 to transmit an execution command corresponding to the first execution condition to at least one peripheral device (not illustrated) that performs operations based on the first execution condition. The communicator 110 may be configured to transmit the execution command corresponding to the first execution condition to the at least one peripheral device (not illustrated) that performs operations based on the first execution condition.

For example, regarding pre-collected context information, the time related execution condition, '7~8 o'clock am', may be extracted, and based on the extracted execution condition, an execution command for performing an operation of turning on the bathroom lights in the lighting apparatus (not illustrated) may be registered. In this example, the communicator 110 may be configured to transmit an execution command corresponding to the execution condition to the lighting apparatus (not illustrated) that performs operations based on the extracted execution condition.

In another example, regarding pre-collected context information, a time related execution condition, '7~8 o'clock am', may be extracted, and based on the extracted execution condition, an execution command for performing an operation of turning on the bathroom lights in the lighting apparatus (not illustrated) and an operation of turning on the boiler hot water in the boiler apparatus (not illustrated) based on the extracted execution condition may be registered. In this example, the communicator 110 may be configured to transmit the execution command corresponding to the execution condition to the lighting apparatus (not illustrated) and boiler apparatus (not illustrated) that perform the operations based on the extracted execution condition.

In response to a first and second execution condition regarding pre-collected context information being extracted from among the execution conditions registered in the first category, the controller 150 may be configured to control the communicator 110 to transmit the execution command that corresponds to each of the first and second execution condition to the at least one peripheral device (not illustrated) that performs operations based on the first and second execution conditions. The communicator 110 may be configured to transmit the execution condition corresponding to each of the first and second execution condition to the at least one peripheral device (not illustrated) that performs operations according to the first and second execution condition.

For example, regarding the pre-collected context information, a first execution condition, 'when Bluetooth communication is connected with the speaker', and a second execution condition, 'when located on the living room sofa' may be extracted in the peripheral device base category. An execution command for outputting audio of the speaker (not illustrated) based on the extracted first execution condition may be registered, and an execution command for performing a power on operation of a display apparatus (not illustrated) such as a smart TV based on the extracted second execution condition may be registered. In this example, the communicator 110 may be configured to transmit audio data and an execution command for playing the audio data to the speaker (not illustrated) that performs operations based on the extracted first execution condition, and may be configured to transmit an execution command for performing an operation of turning on the power to the display apparatus (not illustrated) based on the second execution condition.

In response to an execution condition registered in the first category and an execution condition registered in the second category regarding the pre-collected context information being extracted, the controller 150 may be configured to control the communicator 110 to transmit an execution command corresponding to each execution condition to at least one peripheral device (not illustrated) that performs operations based on each execution condition extracted in the first and second category.

For example, regarding the pre-collected context information, an execution condition, '7~8 o'clock am' in the time base category, and an execution condition, 'when located on the living room sofa', in the peripheral device base category may be extracted. Furthermore, an execution command for performing an operation of turning on the bathroom lights in the lighting apparatus (not illustrated) based on the execution condition, '7~8 o'clock am', may be registered, and an execution command for performing an operation of turning on the power of the display apparatus (not illustrated) such as a smart TV based on an execution condition such as 'when located on the living room sofa' may be registered. In this example, the communicator 110 may be configured to transmit an execution command for performing an operation of turning on the power to the lighting apparatus (not illustrated) and display apparatus (not illustrated) that perform operations based on each extracted execution condition.

An icon being displayed regarding an IoT service may be displayed on a lock screen of the portable terminal apparatus 100, and the icon being displayed on the lock screen may include at least one of a registration icon for registering an IoT service and a magic button icon for executing the IoT service.

Such an icon that includes at least one of a registration icon for registering an IoT service and a magic button icon for executing the IoT service may be displayed, for example, on not only the lock screen of the portable terminal apparatus 100, but also on a background from which the lock screen has been released, and an application execution screen. The icon may request registration of the IoT service or execute the IoT service through the manipulator 121.

According to an example embodiment of the disclosure, in response to a predetermined user command regarding the magic button icon displayed on the portable terminal apparatus 100 being input, the controller 150 may be configured to control the display 130 to display a sub icon corresponding to at least one execution condition executable at a point where the user command is input.

In an example embodiment, in response to a select command regarding the magic button icon being input for or more than a predetermined threshold time, the controller 150 may be configured to control the display 130 to display a sub icon corresponding to at least one execution condition executable at a point where the select command is input.

In response to a select command regarding at least one sub icon being input with the at least one sub icon displayed, the controller 150 may be configured to control the communicator 110 to transmit to at least one peripheral device (not illustrated) an execution command corresponding to an execution condition of a point where the select command regarding the sub icon is input.

According to an example embodiment of the disclosure, in response to a select command regarding the magic button icon displayed on the screen being input, the controller 150 may be configured to perform user certification based on the input select command. The user certification may, for example, be at least one of a user fingerprint and touch input pattern.

In the case of performing user certification through a user fingerprint, the controller 150 may be configured to identify a fingerprint pattern of the user's finger that touched the control magic button icon, and to perform user certification from a degree of similarity between the identified fingerprint pattern and pre-stored fingerprint pattern.

In the case of performing user certification through a touch input pattern, the controller 150 may be configured to track a movement path of the control magic button icon touched and moved by the user, and perform user certification from the degree of similarity between the pattern corresponding to the tracked movement path and the pre-registered touch input pattern. Such a technique of performing user certification from a fingerprint and touch input may be applied through a well-known user certification algorithm.

FIGS. 3A and 3B are diagrams illustrating an example of performing user certification in a portable terminal apparatus.

As illustrated in FIG. 3A, a magic button icon 313 for executing an IoT service may be displayed on a screen 310 of the portable terminal apparatus 100. The user may touch an area where the magic button icon 313 is displayed with his/her finger. In response to the user's finger touching the area where the magic button icon 313 is displayed, the controller 150 may be configured to identify the user's fingerprint 410 touching the displayed area. The controller 150 may be configured to determine the degree of similarity between the identified fingerprint pattern 410 and the pre-stored user fingerprint pattern and perform user certification.

The magic button icon 313 for executing an IoT service may be displayed on the screen 310 of the portable terminal apparatus 100. When such a magic button icon 313 is displayed, the user may touch the displayed magic button icon 313, and move the magic button icon 313 in a pattern as illustrated in FIG. 3B.

The controller 150 may be configured to track a movement path 420 of the moved magic button icon 313 based on a user's select command, and identify a touch input pattern based on the tracked movement path. The controller 150 may be configured to determine the degree of similarity between the identified touch input pattern 420 and the pre-registered touch input pattern and perform user certification.

The disclosure is not limited hereto, and thus the controller 150 may be configured to perform user certification from the number of times the magic button icon 313 is touched or perform user certification by a combination of fingerprint identification and touch input pattern, etc. Moreover, the controller 150 may be configured to perform user certification through password information set by the user or based on pattern identification, or perform user certification through a fingerprint pattern identified through the manipulator 121 such as a home button, etc. As mentioned above, the controller 150 according to the disclosure may be configured to perform user certification using various well-known user certification techniques.

In response to a select command regarding a registration icon for registering an IoT service being input, the controller 150 may be configured to control the display 130 to display a registration UI screen for registering an IoT service. Based on such a control command, the display 130 may display the registration UI screen for registering an IoT service. The registration UI screen may include, for example, an icon corresponding to each of a plurality of predetermined categories. In response to an icon corresponding to each of a plurality of IoT services included in the registration UI screen being selected, and an execution condition and execution command for performing an IoT service in the corresponding category being input, the controller 150 may be configured to register the corresponding execution condition and execution command in the category corresponding to the selected icon and store the same in the storage 140.

As illustrated in FIG. 2, the portable terminal apparatus 100 may further include a sensor (e.g., including sensor circuitry) 160. In an example embodiment, the sensor 160 may include at least one of a motion sensor (not illustrated) and body information sensor (not illustrated).

The motion sensor (not illustrated) may sense a location and movement of the portable terminal apparatus 100 using at least one of an acceleration sensor and gyro sensor. The body information sensor (not illustrated) may be a sensor configured to sense body information that includes, for example, at least one of a user's body temperature, pulse and blood pressure. Such a motion sensor and body information sensor are well-known techniques, and thus detailed explanation thereof will be omitted.

Each configuration of the portable terminal apparatus 100 providing an IoT service according to the disclosure has explained. Hereinafter, explanation will be made in greater detail of an operation of providing an IoT service through various example embodiments in the portable terminal apparatus 100.

Figure 4A:
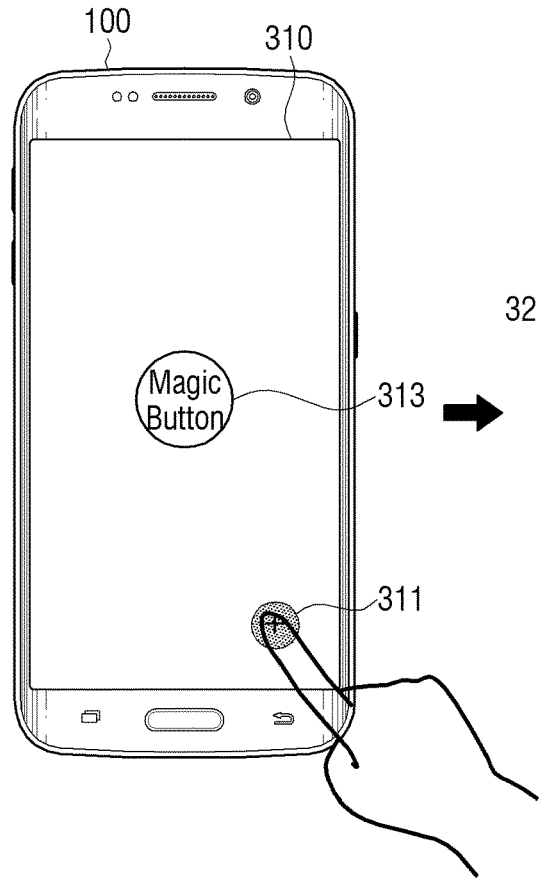
FIGS. 4A-4C are diagrams illustrating an example of registering IoT services in a time based category in a portable terminal apparatus.
Figure 4B:
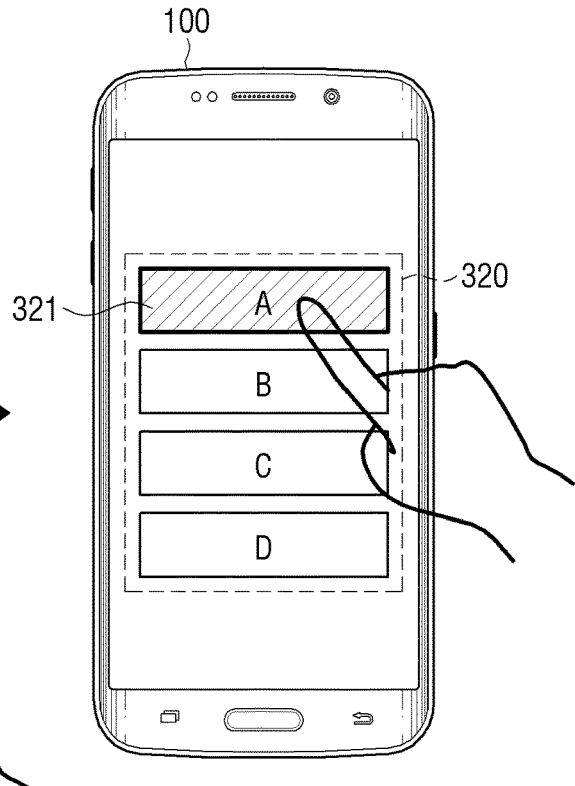
Figure 4C:
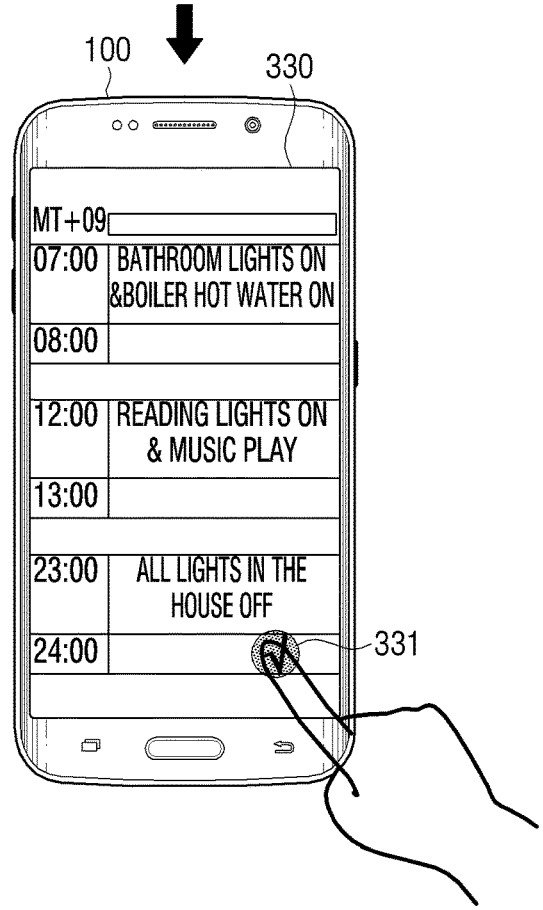

FIGS. 4A-4C are diagrams illustrating an example of registering an IoT service in a time base category in a portable terminal apparatus.

As illustrated in FIG. 4A, the portable terminal apparatus 100 displays a UI screen 310 that includes a registration icon 311 related to registering an IoT service and a magic button icon 313 related to executing the IoT service.

The UI screen may, for example, be one of a lock UI screen of the portable terminal apparatus 100, an execution UI screen of an application related to an IoT service, and a registration UI screen for registering the IoT service.

In response to a select command regarding the registration icon 311 for registering an IoT service being input with the UI screen 310 being displayed, as illustrated in FIG. 4B, the portable terminal apparatus 100 displays a category list 320 that includes an icon corresponding to each of a plurality of predetermined categories regarding the IoT service. In response to an icon 321 corresponding to category A from among a plurality of categories included in the category list 320 being selected, the portable terminal apparatus 100 displays a UI screen 330 for registering an execution condition and execution command of category A base as illustrated in FIG. 4C.

Category A may, for example, be a time base category. In response to a select command regarding the icon 311 corresponding to category A classified in a time base category being input, the portable terminal apparatus 100 may display a UI screen 330 for registering an execution condition and execution command related to time.

In response to a first to third execution condition and an execution command each corresponding to the first to third execution condition being input with the UI screen 300 displayed, it is possible to register each execution command corresponding to the first to third execution condition in the time base category.

For example, as illustrated, a first execution condition related to time, '07:00~08:00', and an execution command for performing an operation of turning on the bathroom lights in the lighting apparatus (not illustrated) and for performing an operation of turning on the boiler hot water in the boiler apparatus (not illustrated) based on the first execution condition may be input. A second execution condition related to time, '12:00~13:00', and an execution command for performing an operation of turning on the reading lights in the lighting apparatus (not illustrated) and for playing music in the portable terminal apparatus 100 based on the second execution condition may be input. A third execution condition related to time, '23:00', and an execution command for performing an operation of turning off the home lights in the lighting apparatus (not illustrated) based on the third execution condition may be input.

In response to such an execution condition and execution command being input, the portable terminal apparatus 100 may register the first to third execution conditions and an execution command corresponding each of the first to third execution conditions in the time base category A.

Figure 5:
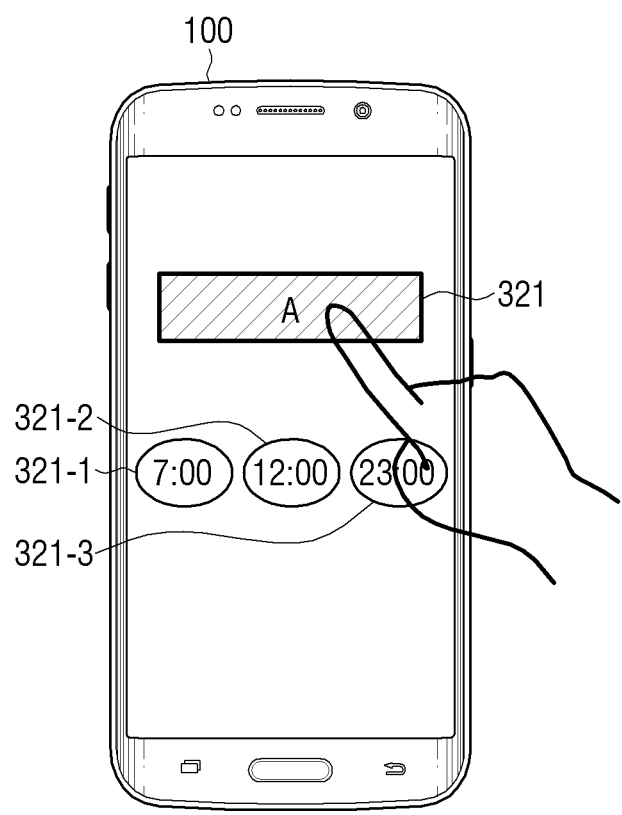
FIG. 5 is a diagram illustrating an example of providing IoT service information registered by category in a portable terminal apparatus.

FIG. 5 is a diagram illustrating an example of providing information on an IoT service registered by category in a portable terminal apparatus.

In response to a predetermined user command regarding an icon corresponding to each of the plurality of categories being input, the portable terminal apparatus 100 displays an item related to an IoT service registered in the category corresponding to the user command input. For example, the predetermined user command may be a command of a condition of a user's touch input being input for or more than a predetermined threshold time.

For example, as explained with reference to FIGS. 4A-4C, in the time base category A, an IoT service including a first to third execution condition and an execution command each corresponding to the first to third execution condition may be registered. With the category A base IoT service registered, in response to a predetermined user command regarding the icon 321 corresponding to category A being input, the portable terminal apparatus 100 displays an item related to the IoT service registered in category A.

As mentioned above, in category A, a first execution condition related to time, '07:00~08:00', and an execution command corresponding to the first execution condition, a second execution condition related to time, '12:00~13:00', and an execution command corresponding to the second execution condition, and a third execution condition related to time, '23:00', and a third execution command corresponding to the third execution condition may be registered.

In response to a select command regarding the icon 321 corresponding to category A being input for or more than a predetermined threshold time, the portable terminal apparatus 100 may extract a plurality of execution conditions registered in category A. As illustrated in FIG. 5, the portable terminal apparatus 100 may display a first to third sub icons 321-1~321-3 corresponding to each extracted execution condition. The portable terminal apparatus 100 may provide execution condition information corresponding to each of the first to third sub icons 321-1~321-3 on the first to third sub icons 321-1~321-3.

The user may more easily check the registration state related to the IoT services in category A from the execution condition information displayed on the first to third sub icons 321-1~321-3.

In response to one being selected with the first to third sub icons 321-1~321-3 displayed, the portable terminal apparatus 100 may display registration information that includes an execution condition and execution command corresponding to the selected sub icon. For example, a select command regarding the first sub icon 321-1 from among the first to third sub icons 321-1321-3 displayed may be input. In this example, based on the input select command, the portable terminal apparatus 100 may display registration information that includes the execution condition and execution command corresponding to the first sub icon 321-1.

The user may check that an execution command is registered for performing an operation of turning on the bathroom lights and performing an operation of turning on the boiler hot water in the boiler apparatus (not illustrated) between 7 o'clock and 8 o'clock based on the registration information that includes the first execution condition corresponding to the first sub icon 321-1 and the execution command corresponding to the first sub icon 321-1. The user may edit at least one of the first execution condition and execution command corresponding to the first execution condition based on the registration information displayed.

Figure 6:
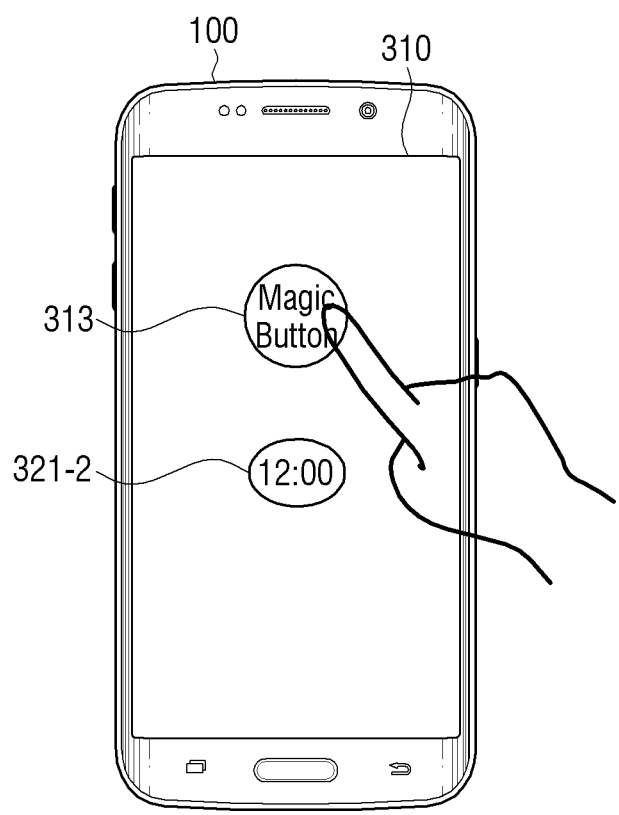
FIG. 6 is a diagram illustrating an example of providing IoT service information registered by category in a portable terminal apparatus.

FIG. 6 is a diagram illustrating an example of providing information on an IoT service registered by category in a portable terminal apparatus.

As illustrated in FIG. 6, in response to a predetermined user command being input with the magic button icon 313 for executing an IoT service being displayed, the portable terminal apparatus 100 may display a sub icon 321-2 corresponding to at least one execution condition executable at a point where the user command is input. The predetermined user command may be a command of a condition of a user's touch input being input for or more than a predetermined threshold time.

For example, as illustrated in FIGS. 4A-4C, in time base category A, an IoT service that includes a first to third execution condition and an execution command corresponding to the first to third execution condition may be registered. In response to a select command of the magic button icon 313 for an IoT service being input for a predetermined threshold time with the IoT service of time base category A registered, the portable terminal apparatus 100 may determine whether or not there is an execution condition executable at a point where the select command is input from among a plurality of execution conditions registered in category A.

As mentioned above, in category A, a first execution condition related to time, '07:00~08:00', and an execution command corresponding to the first execution condition, a second execution condition related to time, '12:00~13:00', and an execution command corresponding to the second execution condition, and a third execution condition related to time, '23:00', and an execution command corresponding to the third execution condition may be registered.

In response to determining that from among the first to third execution conditions registered in category A, the second execution condition is executable at the point where the select command is input, the portable terminal apparatus 100 may display the second sub icon 321-2 corresponding to the second execution condition from among the plurality of sub icons corresponding to the first to third execution conditions. For example, the portable terminal apparatus 100 may display information related to the second execution condition on the second sub icon 321-2 displayed. Therefore, the user may more intuitively check whether or not it is possible to currently use an IoT service from the displayed second sub icon 321-2.

In response to a select command regarding the second sub icon 321-2 being input, the portable terminal apparatus 100 may perform an operation corresponding to the select command regarding the second sub icon 321-2 through another example embodiment of the present disclosure as follows.

In an example embodiment, in response to a select command regarding the second sub icon 321-2 being input, the portable terminal apparatus 100 may transmit an execution command corresponding to the second execution condition to a peripheral device that performs an operation based on the second execution condition corresponding to the second sub icon 321-2.

In another example embodiment, in response to a select command regarding the second sub icon 321-2 being input, the portable terminal apparatus 100 may display registration information that includes the second execution condition corresponding to the second sub icon 321-2 and the execution command.

The user may check that an execution command is registered for performing an operation of turning on the reading lights in the lighting apparatus (not illustrated) and for playing music in the portable terminal apparatus 100 between 12 o'clock and 13 o'clock based on the registration information that includes the second execution condition corresponding to the second sub icon 321-2 displayed and the execution command corresponding to the second execution condition. The user may edit at least one of the second execution condition and the execution command corresponding to the second execution condition based on the registration information displayed.

Figure 7A:
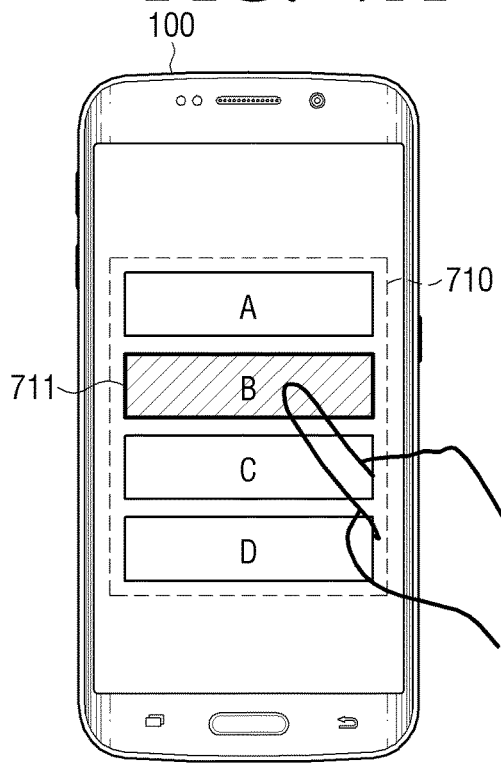
FIGS. 7A-7C are diagrams illustrating an example of registering IoT services in a location based category in a portable terminal apparatus.
Figure 7B:
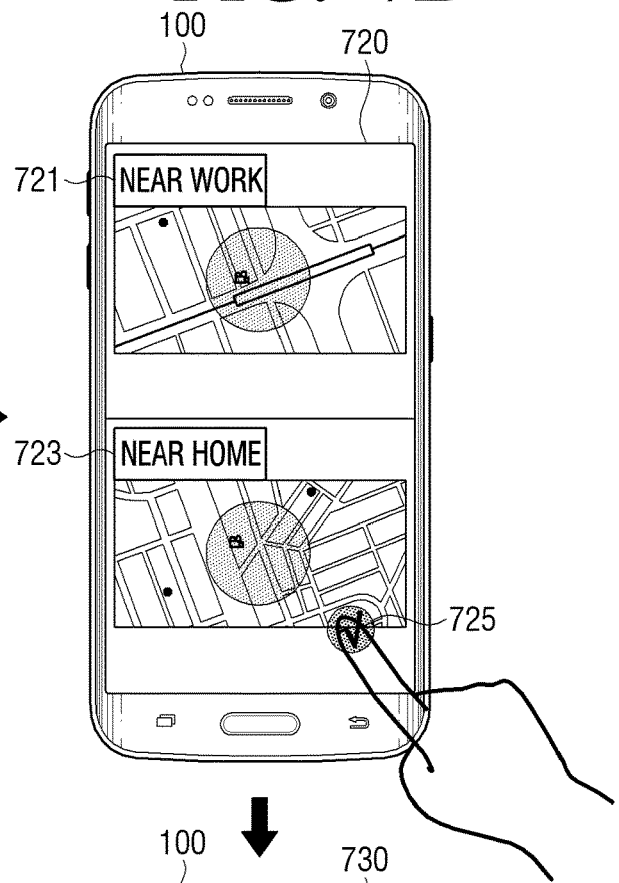
Figure 7C:
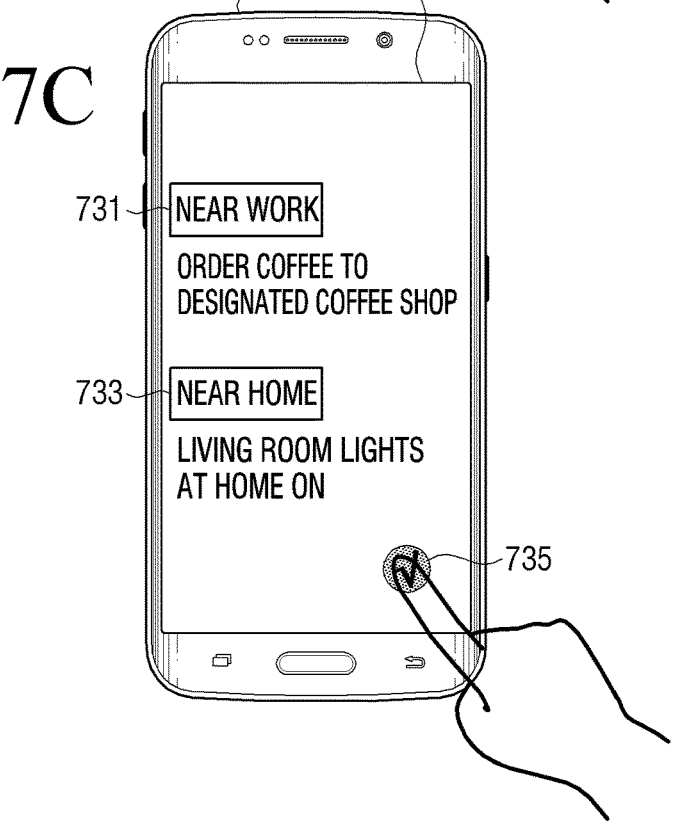

FIGS. 7A-7C are diagrams illustrating an example of registering an IoT service in a location base category in a portable terminal apparatus.

As explained with reference to FIG. 4A, the portable terminal apparatus 100 displays a UI screen 310 that includes a registration icon 311 related to registering an IoT service and a magic button icon 313 related to executing the IoT service.

The UI screen may be one of a lock UI screen of the portable terminal apparatus 100, an execution UI screen of an application related to an IoT service, and a registration UI screen for registering the IoT service.

In response to a select command for the registration icon 311 for registering an IoT service being input with the UI screen 310 displayed (see FIG. 4A), as illustrated in FIG. 7A, the portable terminal apparatus 100 displays a category list 710 that includes an icon corresponding to each of a plurality of categories predetermined regarding an IoT service. In response to an icon 711 corresponding to category B from among a plurality of categories included in the category list 710 being selected, as illustrated in FIG. 7B, the portable terminal apparatus 100 displays a UI screen 720 for registering an execution condition based on category B. For example, category B may be a location base category. In response to a select command regarding the icon 711 corresponding to category B classified as the location base category being input, the portable terminal apparatus 100 may display a UI screen 720 for registering a location base execution condition.

With such a UI screen 720 displayed, the portable terminal apparatus 100 may register an execution condition that includes a location selected based on a user command and identification information indicating that location.

In an example embodiment, with the UI screen displayed, the user may input a first execution condition information that includes information on a work address and its identification information, and input a second execution condition information that includes information on a home address and its identification information. Accordingly, the portable terminal apparatus 100 may set a point within a diameter predetermined based on the first execution condition information input as a first execution condition, 'near work', and display a first icon 721 corresponding to the first execution condition set. The portable terminal apparatus 100 may set a point within a diameter predetermined based on the second execution condition information input as a second execution condition, 'near home', and display a second icon 723 corresponding to the second execution condition set.

In another example embodiment, the portable terminal apparatus 100 may display a map based on a user command, and may set on the displayed map a first execution condition, 'near work', and a second execution condition, 'near home', based on a touched area and input identification information based on the user command.

In another example embodiment, the portable terminal apparatus 100 may obtain location information of a point where a user command is input, and set a first execution condition, 'near work', and a second execution condition, 'near home', based on identification information input related to the location information obtained.

However, the present disclosure is not limited thereto, and thus a location base execution condition may be set through a combination of the aforementioned embodiments.

In response to a select command being input regarding a registration icon 725 displayed on a UI screen 720 with an execution condition set on a time base category through such a variety of example embodiments, the portable terminal apparatus 100 registers an execution condition set on the time base category, and displays a UI screen 730 for registering an execution command corresponding to each execution condition.

In response to the UI screen 730 for registering an execution command being displayed, the user inputs an execution command corresponding to each execution condition. For example, as illustrated in FIG. 7C, with the UI screen 730 for registering an execution command displayed, if a first execution condition is satisfied, the user inputs an execution command for automatically ordering coffee. The portable terminal apparatus 100 may set the execution command for ordering coffee to a POS terminal apparatus (not illustrated) of a coffee shop that the user requested based on the input execution command.

With the UI screen 730 for registering an execution command displayed, if the aforementioned second execution condition is satisfied, the user inputs an execution command for turning on the living room lights at home. Accordingly, the portable terminal apparatus 100 may set the execution command for turning on the power of the lighting apparatus (not illustrated) of the user's home based on the execution command input.

As mentioned above, in response to each execution command corresponding to the first and second execution condition being set, the portable terminal apparatus 100 displays a first and second icon corresponding to each execution command set. In response to a select command regarding a registration icon 735 displayed on the UI screen 730 with the first and second icon 731, 733 corresponding to each execution command set, the portable terminal apparatus 100 displays a first and second icon 731, 733 corresponding to each execution command set. In response to a select command regarding the registration icon 735 displayed on the UI screen 730 being input with the first and second icon 731, 733 corresponding to each execution command displayed, the portable terminal apparatus 100 may match the execution command set regarding each of the first and second execution condition pre-registered to each of the first and second execution condition and store the same.

In response to an execution condition and execution command that can be used on a location base category being registered, the portable terminal apparatus 100 may provide an IoT service in consideration of the current location of the user.

In an example embodiment, in response to determining that the user is located near work, the portable terminal apparatus 100 may determine that the first execution condition is satisfied, and transmit an execution command corresponding to the first execution condition to a POS terminal apparatus (not illustrated) of a coffee shop requested by the user. The POS terminal apparatus (not illustrated) may automatically perform an operation of ordering coffee based on the execution command received from the portable terminal apparatus 100.

In another example embodiment, in response to determining that the user is located near work, the portable terminal apparatus 100 determines that the first execution is satisfied, and displays the magic button icon 313 related to executing an IoT service. In response to the select command regarding the displayed magic button icon 313 being input, the portable terminal apparatus 100 transmits the execution command corresponding to the first execution command to the POS terminal apparatus (not illustrated) of the coffee ship designated by the user. The POS terminal apparatus (not illustrated) may automatically perform an operation of ordering coffee based on the execution command received from the portable terminal apparatus 100.

In another example embodiment, in response the user located work, the user may touch the magic button icon 313 displayed on the portable terminal apparatus 100. In response to such a select command being input, the portable terminal apparatus 100 transmits the execution command corresponding to the first execution condition to the POS terminal apparatus (not illustrated). The POS terminal apparatus (not illustrated) may automatically perform an operation of ordering coffee based on the execution command received from the portable terminal apparatus 100.

Figure 8A:
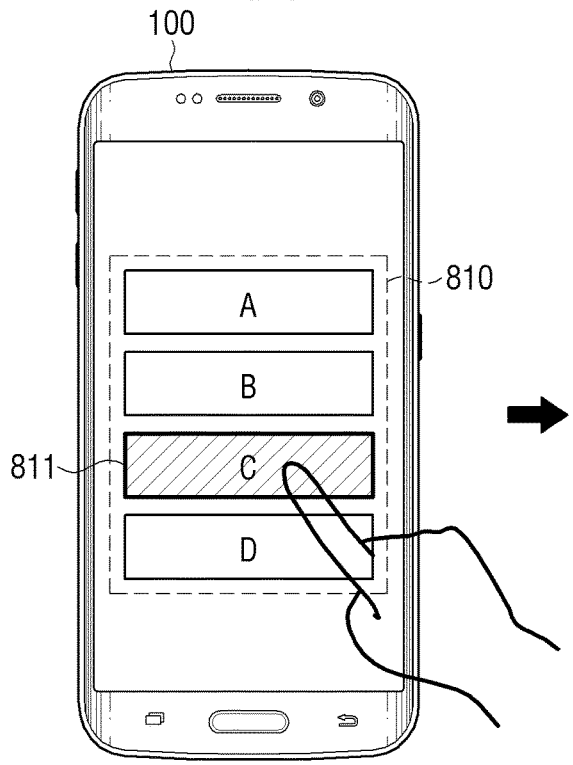
FIGS. 8A-8C are diagrams illustrating an example of registering IoT services in a time and location based category in a portable terminal apparatus.
Figure 8B:
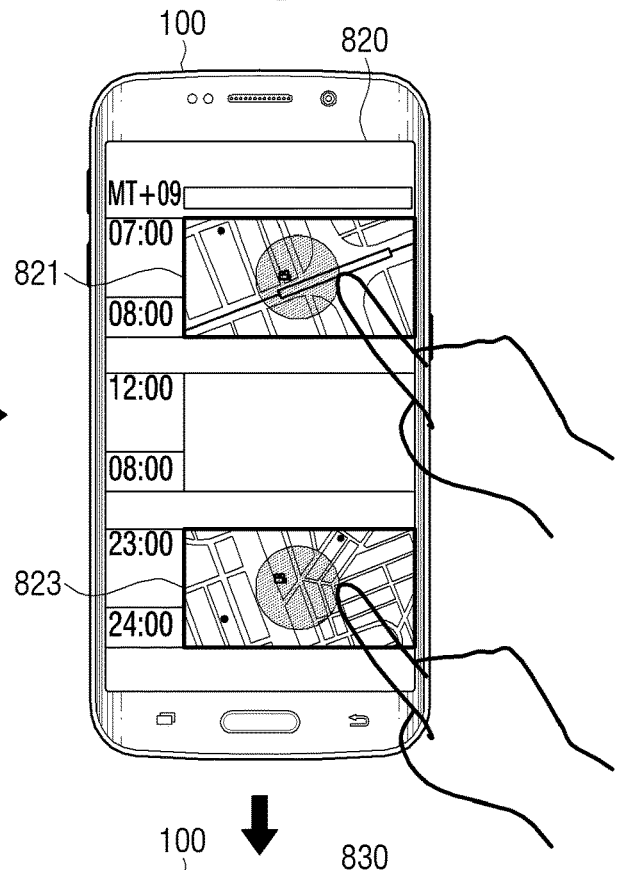
Figure 8C:
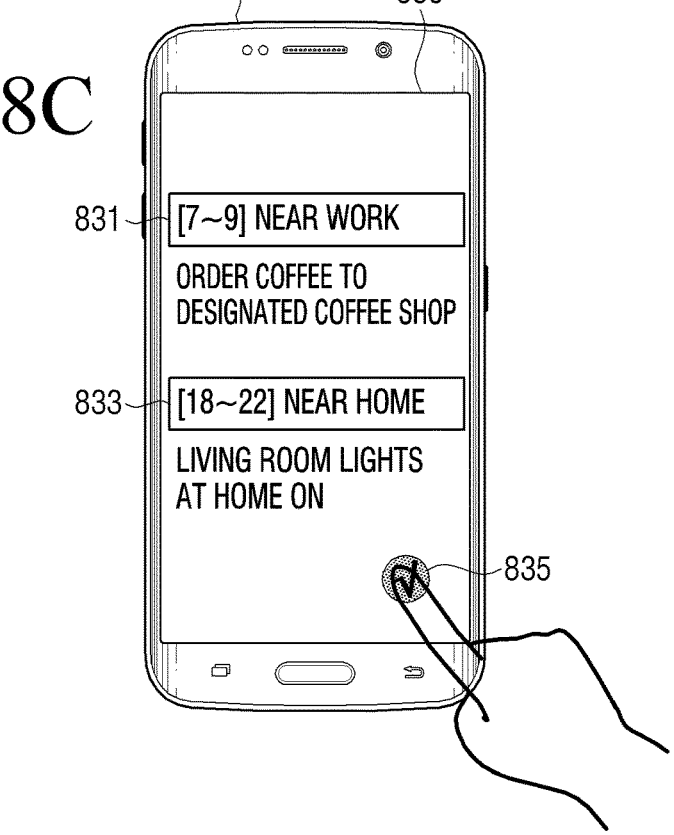

FIGS. 8A-8C are diagrams illustrating an example of registering an IoT service in a time and location base category in a portable terminal apparatus.

As explained with reference to FIG. 4A, the portable terminal apparatus 100 displays a UI screen 310 that includes a registration icon 311 related to registering an IoT service and a magic button icon 313 related to executing the IoT service.

The UI screen may be one of a lock UI screen of the portable terminal apparatus 100, an execution UI screen of an application related to an IoT service, and a registration UI screen for registering the IoT service.

In response to a select command regarding the registration icon 311 for registering the IoT service being input with such a UI screen 310 displayed, as illustrated in FIG. 8A, the portable terminal apparatus 100 displays a category list 810 that includes an icon corresponding to each of the plurality of categories predetermined regarding the IoT service. In response to an icon 811 corresponding to category C being selected from among the plurality of categories included in the category list 810, the portable terminal apparatus 100 displays a UI screen 820 for registering an execution condition of category C base as illustrated in FIG. 8B.

For example, category C may be a time and location base category. In response to a select command being input regarding the icon 811 corresponding to the category classified as the time and location base category, the portable terminal apparatus 100 may display the UI screen 820 for registering the time and location base execution condition.

With such a UI screen 820 displayed, the portable terminal apparatus 100 may set a first and second execution condition that includes time information, location information, and identification information based on the user command. For example, based on the user command input, the portable terminal apparatus 100 may set a first execution condition, 'when located near work between 7 and 9 o'clock', and a second execution condition, 'when located near home between 18 and 22 o'clock'.

In response to setting such a first and second execution condition, the portable terminal apparatus 100 may display a first and second icon 821, 823 corresponding to the first and second execution condition. The portable terminal apparatus 100 receives input of an execution command each corresponding to the first and second execution condition.

For example, with the UI screen 830 for registering an execution command displayed as illustrated in FIG. 8C, if the aforementioned first execution condition is satisfied, the user inputs an execution command for automatically ordering coffee in the coffee shop designated by the user. The portable terminal apparatus 100 may set an execution command for ordering coffee in the POS terminal apparatus (not illustrated) of the coffee shop requested by the user based on the input execution command.

With the UI screen 830 for registering an execution command displayed, if the aforementioned second execution condition is satisfied, the user may input an execution command for turning on the living room lights at home. The portable terminal apparatus 100 may set an execution command for turning on the power in the lighting apparatus (not illustrated) of the user's home based on the input execution command.

In response to an execution command corresponding to each of the first and second execution condition being set, the portable terminal apparatus 100 displays a first and second icon 831, 833 corresponding to each of the set execution command. In response to a select command regarding the registration icon 835 displayed on the UI screen 830 being input with the first and second icon 831, 833 corresponding to each execution command displayed, the portable terminal apparatus 100 may match the execution command set regarding each of the first and second execution condition pre-registered to the first and second execution condition respectively and store the same.

In response to an execution condition and execution command that may be used on a location base category being registered, the portable terminal apparatus 100 may provide an IoT service in consideration of the user's current location.

In an example embodiment, in response to determining that the user is located near work at 7:30, the portable terminal apparatus 100 determines that the first execution condition is satisfied, and transmits the execution command corresponding to the first execution condition to the POS terminal apparatus (not illustrated) of the coffee ship. The POS terminal apparatus (not illustrated) may perform an operation of automatically ordering coffee based on the execution command received from the portable terminal apparatus 100.

In another example embodiment, in response to determining that the user is located near work at 7:30, the portable terminal apparatus 100 determines that the first execution condition is satisfied, and displays the magic button icon related to executing the IoT service. In response to a select command regarding the magic button icon 313 displayed being input, the portable terminal apparatus 100 transmits an execution command corresponding to the first execution condition to the POS terminal apparatus (not illustrated). The POS terminal apparatus (not illustrated) may automatically perform an operation of ordering coffee based on the execution command received from the portable terminal apparatus 100.

In another example embodiment, the user located near work may touch the magic button icon 313 displayed on the portable terminal apparatus 100. In response to such a select command being input, the portable terminal apparatus 100 determines whether or not the first execution condition is satisfied based on the user's current location (near work) and current time. In response to determining that the first execution condition is satisfied, the portable terminal apparatus 100 transmits the execution command corresponding to the first execution condition to the POS terminal apparatus (not illustrated) of the coffee ship. The POS terminal apparatus (not illustrated) may automatically perform an operation of ordering coffee based on the execution command received from the portable terminal apparatus 100.

Figure 9A:
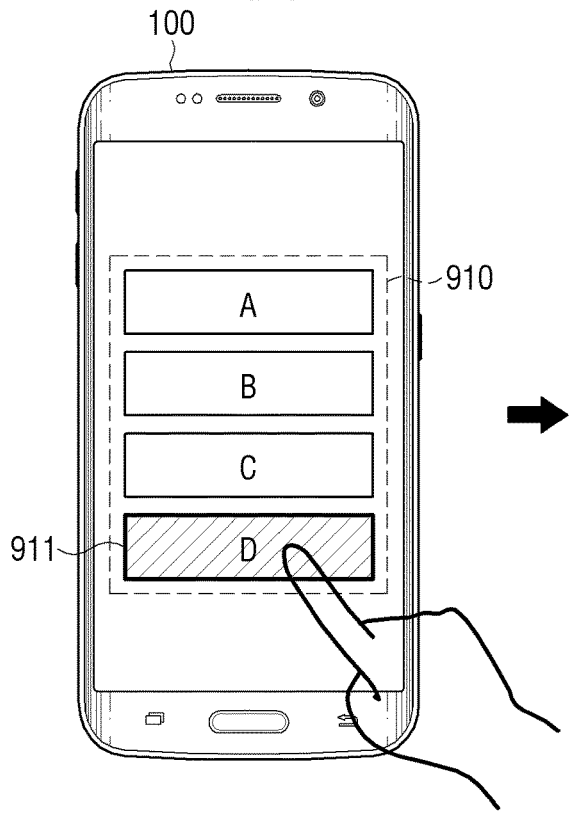
FIGS. 9A-9C are diagrams illustrating an example of registering IoT services in a periphery device based category in a portable terminal apparatus.
Figure 9B:
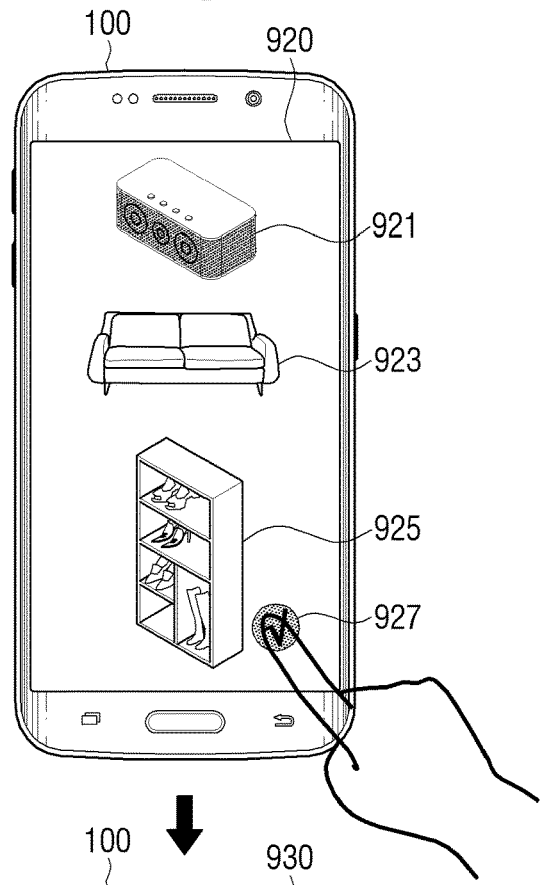
Figure 9C:
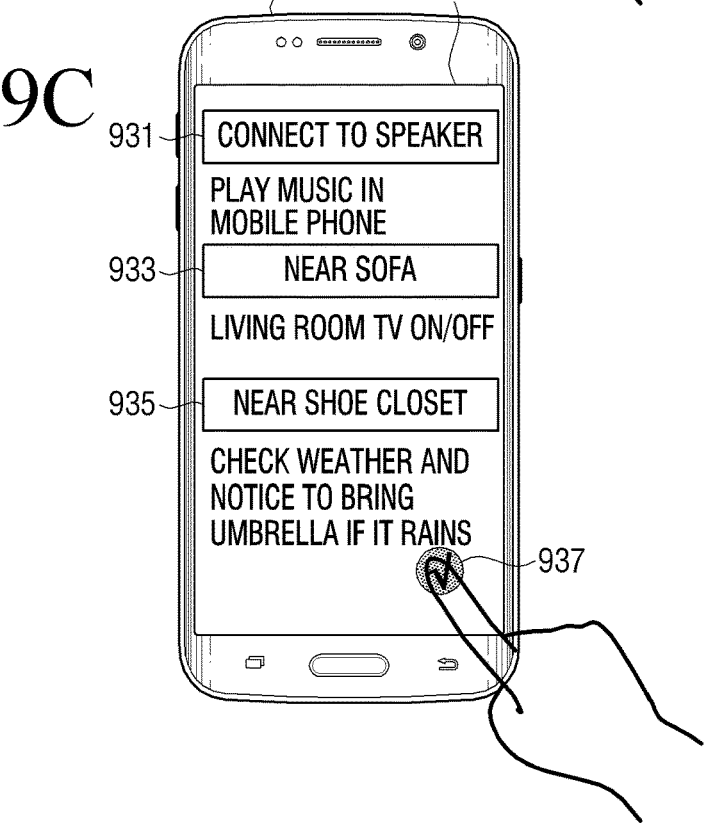

FIGS. 9A-9C are diagrams illustrating an example of registering an IoT service in a category of a peripheral device base in a portable terminal apparatus.

As explained with reference to FIG. 4A, the portable terminal apparatus 100 displays a UI screen 310 that includes a registration icon 311 related to registering an IoT service and a magic button icon 313 related to executing the IoT service.

For example, the UI screen may be one of a lock UI screen of the portable terminal apparatus 100, an execution UI screen of an application related to an IoT service, and a registration UI screen for registering the IoT service.

In response to a select command regarding the registration icon 311 for registering an IoT service being input with such a UI screen 310 displayed, as illustrated in FIG. 9A, the portable terminal apparatus 100 displays a category list 910 that includes an icon each corresponding to each of a plurality of categories predetermined regarding the IoT service. In response to an icon 911 corresponding to category D being selected from among a plurality of categories included in the category list 910, the portable terminal apparatus 100 displays a UI screen 920 for registering an execution condition of category D base as illustrated in FIG. 9B.

For example, category D may be a peripheral device base category. In response to a select command regarding icon 911 corresponding to the category classified as a peripheral device base category being input, the portable terminal apparatus 100 may display a UI screen for registering an execution condition of a peripheral device base.

With such a UI screen 920 displayed, the portable terminal apparatus 100 may set a first to third execution condition that includes at least one of peripheral device information, location information, weather information and identification information based on the user command. For example, according to the input user command, the portable terminal apparatus 100 may set a first execution condition, 'when the speaker is connected to the portable terminal apparatus', a second execution condition, 'when the portable terminal apparatus is located near the sofa', and a third execution condition, 'when the portable terminal apparatus is located near the shoe closet'.

In response to such first to third execution conditions being set, the portable terminal apparatus 100 may display a first to third icons 921~925 corresponding to the first to third execution condition. The portable terminal apparatus 100 may receive input of an execution command corresponding to each of the first to third execution condition.

For example, as illustrated in FIG. 9C, with the UI screen 930 for registering an execution command displayed, if the first execution command is satisfied, the user inputs an execution command for audio outputting in a speaker (not illustrated) capable of performing bluetooth communication. The portable terminal apparatus 100 may set an execution command for audio outputting in the speaker (not illustrated) based on the input execution command.

With the UI screen 930 for registering an execution command displayed, if the second execution condition is satisfied, the user inputs an execution command for turning on the power of a display apparatus (not illustrated) such as a smart TV. The portable terminal apparatus 100 may set an execution command for turning on the power of the display apparatus (not illustrated) based on the input execution command.

With the UI screen 930 for registering the execution command displayed, if the third execution condition aforementioned is satisfied, the user inputs an execution command for providing weather information in the portable terminal apparatus 100. The portable terminal apparatus 100 may set an execution command for providing the weather information based on the input execution command.

In response to an execution command corresponding to each of the first to third execution condition being set, the portable terminal apparatus 100 displays a first to third icons 931~035 corresponding to each of the execution commands. In response to a select command regarding a registration icon 937 displayed on the UI screen 930 being input with the first to third icons 931~935 corresponding to each execution command displayed, the portable terminal apparatus 100 may match the execution command set regarding each of the first to third execution condition to each of the first to third execution condition and register-store the same.

In response to the execution condition and execution command that may be used in a peripheral device category being registered, the portable terminal apparatus 100 may provide an IoT service in consideration of the state of the peripheral device and the user's current location.

In an example embodiment, in response to being connected to the speaker (not illustrated) in bluetooth communication, the portable terminal apparatus 100 determines that the first execution condition is satisfied, and transmits sound source data stored in the portable terminal apparatus 100 to the speaker (not illustrated). The speaker (not illustrated) may output audio based on the sound source data received from the portable terminal apparatus 100.

However, there is no limitation thereto, and in response to determining that the first execution conditions is satisfied, the portable terminal apparatus 100 displays the magic button icon 313 related to executing the IoT service. In response to a select command regarding the displayed magic button icon 131 being input, the portable terminal apparatus 100 transmits the sound source data stored in the portable terminal apparatus 100. The speaker (not illustrated) may output audio based on the sound source data received from the portable terminal apparatus 100.

In another example embodiment, the portable terminal apparatus 100 measures an intensity of an IR signal received from at least one peripheral device (not illustrated), and in response to an intensity of the IR signal received from a peripheral device (not illustrated) attached to a sofa being or more than a predetermined value, the portable terminal apparatus 100 determines that the user is located near the sofa. In response to determining the user being located near the sofa, the portable terminal apparatus 100 determines that the second execution condition is satisfied, and based on the execution condition corresponding to the second execution condition, transmits the execution command for performing the operation of turning the power on to the display apparatus (not illustrated). The display apparatus (not illustrated) may perform an operation of turning on the power based on the execution command received from the portable terminal apparatus 100.

However, there is no limitation thereto, and thus in response to determining that the second execution condition is satisfied, the portable terminal apparatus 100 displays the magic button icon 313 related to executing the IoT service. In response to receiving input of a select command regarding the magic button icon 313 displayed, the portable terminal apparatus 100 may transmit an execution command to the display apparatus (not illustrated), and perform an operation of turning on the power based on the execution command received from the portable terminal apparatus 100.

Figure 10A:
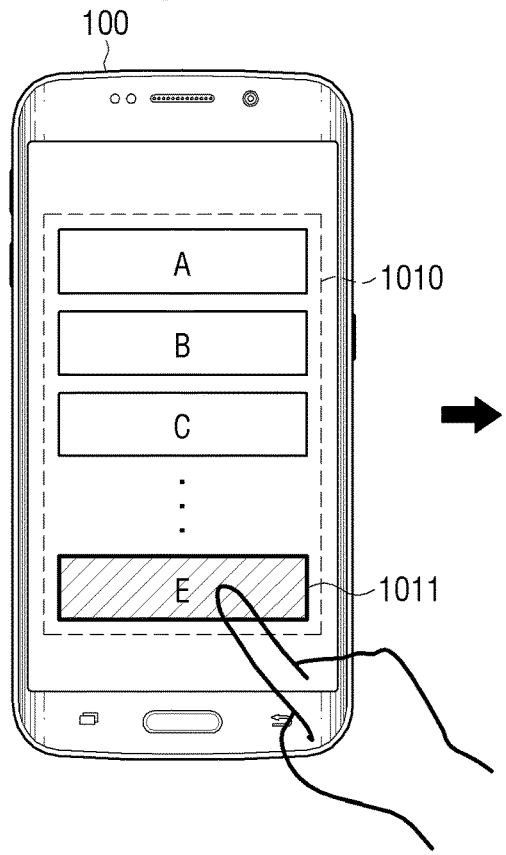
FIGS. 10A-10C are diagrams illustrating an example of registering IoT services in a weather device based category in a portable terminal apparatus.
Figure 10B:
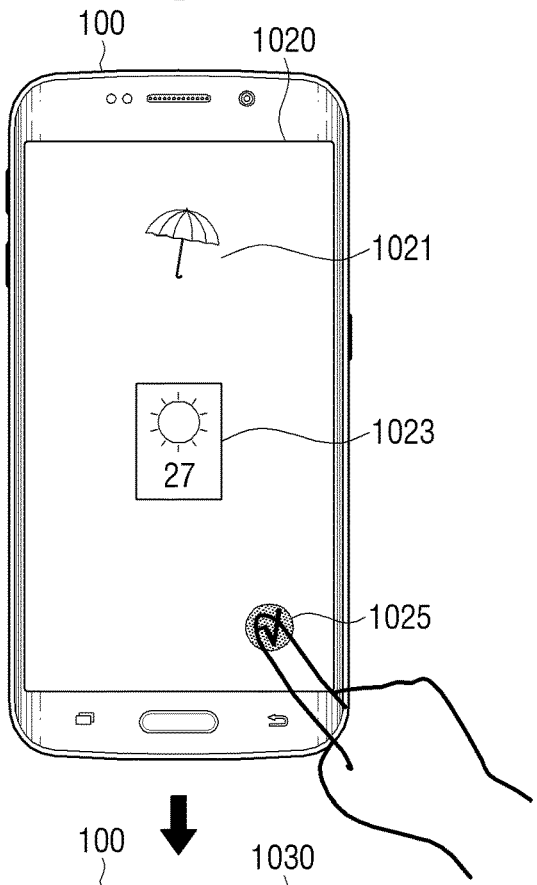
Figure 10C:
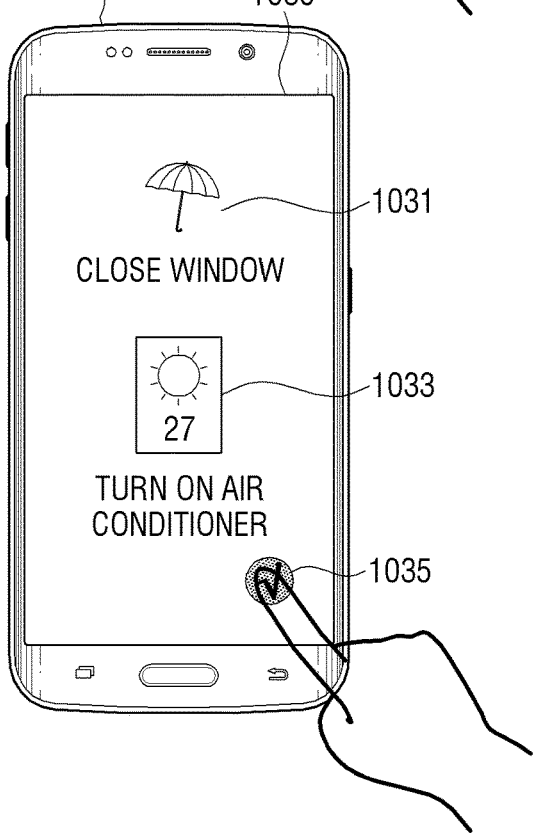

FIGS. 10A-10C are diagrams illustrating an example of registering an IoT service in the weather device base category in a portable terminal apparatus.

As explained with reference to FIG. 4A, the portable terminal apparatus 100 displays a UI screen 310 that includes a registration icon 311 related to registering an IoT service and a magic button icon 313 related to executing the IoT service.

For example, the UI screen may be one of a lock UI screen of the portable terminal apparatus 100, an execution UI screen of an application related to an IoT service, and a registration UI screen for registering the IoT service.

In response to receiving a select command regarding the registration icon 311 for registering an IoT with such a UI screen 310 displayed, as illustrated in FIG. 10A, the portable terminal apparatus 100 displays a category list 1010 that includes an icon corresponding to each of the plurality of predetermined categories regarding the IoT service. In response to an icon 1011 corresponding to E category from among the plurality of categories included in such a category list 1010 being selected, the portable terminal apparatus 100 displays a UI screen 1020 for registering an execution condition of category E base as illustrated in FIG. 10B.

For example, category E may be a weather base category. In response to a select command regarding the icon 1011 corresponding to the category classified as the weather base category being input, the portable terminal apparatus 100 may display the UI screen 1020 for registering a weather base execution condition.

With such a UI screen 1020 displayed, the portable terminal apparatus 100 may set a first and second execution condition that includes at least one of weather information and identification information based on the user command. For example, based on the user command input, the portable terminal apparatus 100 may set a first execution condition, 'when it rains', and a second execution condition, 'when the weather is good and the temperature is 27 degrees or more'.

In response such a first and second execution condition being set, the portable terminal apparatus 100 may display a first and second icon 1021, 1023 corresponding to the set first and second execution condition. The portable terminal apparatus 100 receives input of an execution command corresponding to each of the first and second execution condition.

For example, as illustrated in FIG. 10C, with the UI screen 1030 for registering an execution command displayed, if the aforementioned first execution condition is satisfied, the user inputs an execution command for closing a window opened in a door apparatus (not illustrated). The portable terminal apparatus 100 may set an execution command for closing the window in the door apparatus (not illustrated) based on the execution command input.

With the UI screen 1030 for registering an execution command displayed, if the aforementioned second execution condition is satisfied, the user inputs an execution command for turning on the power of the air conditioner (not illustrated) based on the input execution command. The portable terminal apparatus 100 may set an execution command for turning on the power of the air conditioner (not illustrated) based on the input execution command.

In response to an execution command corresponding to each of the first and second execution condition being set, the portable terminal apparatus 100 displays the first and second icon 1031, 1033 corresponding to each execution command set. In response to a select command regarding the registration icon 1035 displayed on the UI screen being input with the first and second icon 1031, 1033 corresponding to each execution command displayed, the portable terminal apparatus 100 may match the execution command set regarding each of the first and second execution condition pre-registered to each of the first to third execution condition and store the same.

As mentioned above, in response to the execution condition and execution command that may be used in the weather base category being registered, the portable terminal apparatus 100 may provide an IoT service based on the weather information.

In an example embodiment, in response to determining that the current weather is raining based on the received weather information, the portable terminal apparatus 100 determines that the first execution condition is satisfied, and based on the execution command corresponding to the first execution condition, transmits the execution command corresponding to the first execution condition to the door apparatus (not illustrated). The door apparatus (not illustrated) may perform an operation of closing the open window based on the execution command received from the portable terminal apparatus 100.

However, there is no limitation thereto, and thus in response to determining that the first execution condition is satisfied, the portable terminal apparatus 100 displays the magic button icon 313 related to executing an IoT service. In response to a select command regarding the magic button icon 313 displayed being input, the portable terminal apparatus 100 transmits an execution command corresponding to the first execution condition to the door apparatus (not illustrated). The door apparatus (not illustrated) may perform an operation of closing the opened window based on the execution command received from the portable terminal apparatus 100.

Figure 11A:
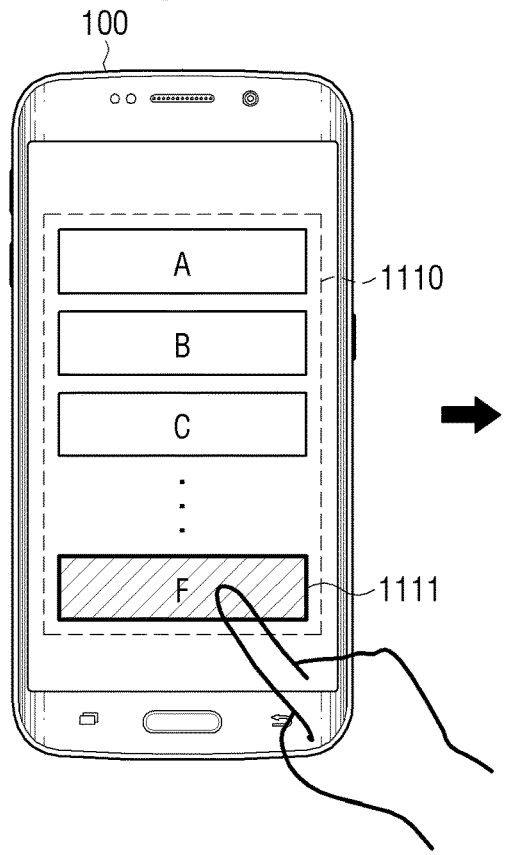
FIGS. 11A-11C are diagrams illustrating an example of registering IoT services in a health device based category in a portable terminal apparatus.
Figure 11B:
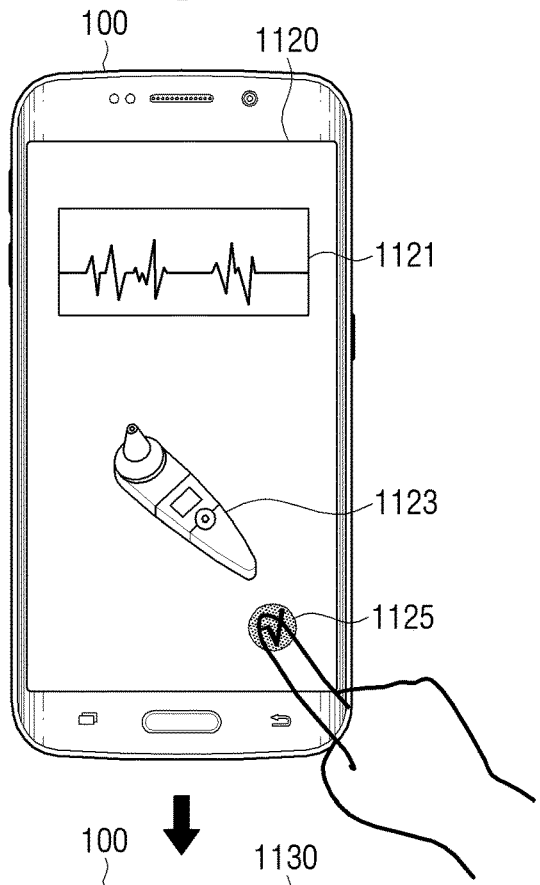
Figure 11C:
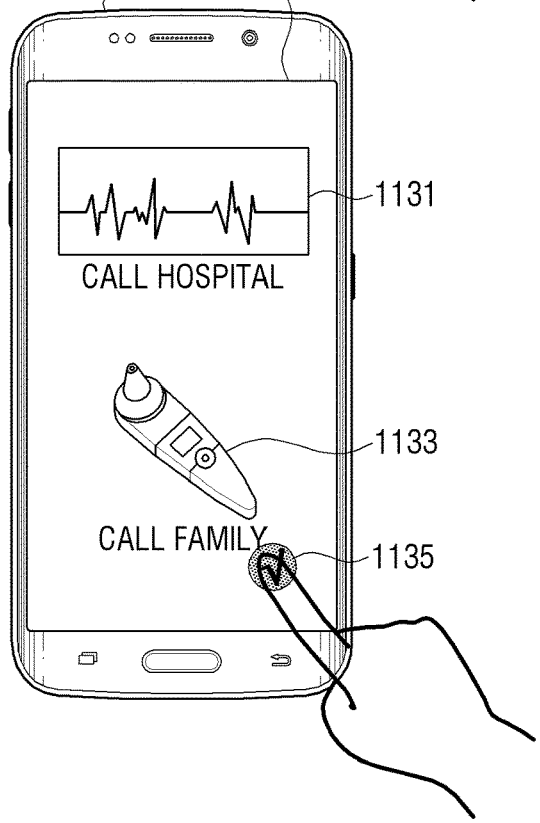

FIGS. 11A-11C are diagrams illustrating an example of registering an IoT service in a health device base category in a portable terminal apparatus.

As explained with reference to FIG. 4A, the portable terminal apparatus 100 displays the UI screen 310 that includes the registration icon 311 related to registering an IoT service and the magic button icon 313 related to executing the IoT service.

For example, the UI screen may be one of a lock UI screen of the portable terminal apparatus 100, an execution UI screen of an application related to an IoT service, and a registration UI screen for registering the IoT service.

In response to a select command regarding the registration icon 311 for registering an IoT service being input with such a UI screen 310 displayed, as illustrated in FIG. 11A, the portable terminal apparatus 100 displays the category list 1110 that includes an icon corresponding to each of the plurality of predetermined categories regarding the IoT service. In response to the icon 1111 corresponding to category F from among the plurality of categories included in such a category list 1110 being selected, as illustrated in FIG. 11B, the portable terminal apparatus 100 displays the UI screen 1120 for registering the category F based execution condition.

For example, category F may be a health base category. In response to a select command regarding the icon 1111 corresponding to the category classified as the health base category being input, the portable terminal apparatus 100 may display the UI screen 1120 for registering the health base execution condition.

With such a UI screen 1120 displayed, the portable terminal apparatus 100 may set a first and second execution condition that includes at least one of pulse information, blood pressure information, temperature information and alarm information for contacting in emergency situations based on a user command. For example, according to the input user command, the portable terminal apparatus 100 may set a first execution condition, 'when the pulse or blood pressure is less than a reference value', and a second execution condition, 'when the body temperature is less than the reference value'.

In response to such a first and second execution condition being set, the portable terminal apparatus 100 may display a first and second icon 1121, 1123 corresponding to the set first and second execution condition. The portable terminal apparatus 100 receives input of an execution command corresponding to each of the first and second execution condition.

For example, as illustrated in FIG. 11C, with the UI screen 1130 for registering an execution command displayed, if the aforementioned first execution condition is satisfied, the user inputs an execution command for transmitting an emergency situation notification message to an emergency server (not illustrated) in the portable terminal apparatus 100. The portable terminal apparatus 100 may set an execution command for transmitting an emergency situation alarm message based on the input execution command.

With the UI screen 1130 for registering an execution command displayed, if the aforementioned second execution condition is satisfied, the user inputs an execution command for automatic telephone connection and transmission of an emergency situation notification message to a smart phone (not illustrated) of a family. The portable terminal apparatus 100 may set an execution command for automatic telephone connection and transmission of an emergency situation notification message based on the input execution command.

In response to an execution command corresponding to each of the first and second execution condition being set, the portable terminal apparatus 100 displays a first and second icon 1131, 1133 corresponding to each execution command set. In response to a select command regarding the registration icon 1135 displayed on the UI screen 1130 being input with the first and second icon 1131, 1133 corresponding to each execution command displayed, the portable terminal apparatus 100 may match an execution command set regarding each of the first and second execution condition pre-registered to each of the first to third execution condition, and store the same.

In response to an execution condition and execution command that may be used in the health base category being registered, the portable terminal apparatus 100 may provide an IoT service based on the measured body information.

In an example embodiment, the portable terminal apparatus 100 regularly receives pulse information measured from a smart watch (not illustrated) communicable with the portable terminal apparatus 100, and analyzes the received pulse information to determine whether or not the pulse is a normal level. In response to determining that the pulse is not a normal level, the portable terminal apparatus 100 determines that the first execution condition is satisfied, and transmits an emergency situation notification message to an emergency room server (not illustrated) based on an execution command corresponding to the first execution condition.

However, there is no limitation thereto, and in response to determining that the first execution condition is satisfied, the portable terminal apparatus 100 displays the magic button icon 313 related to executing the IoT service. In response to a select command regarding the magic button icon 313 displayed being input, the portable terminal apparatus 100 may transmit an emergency situation alarm message to the emergency room server (not illustrated).

Figure 12A:
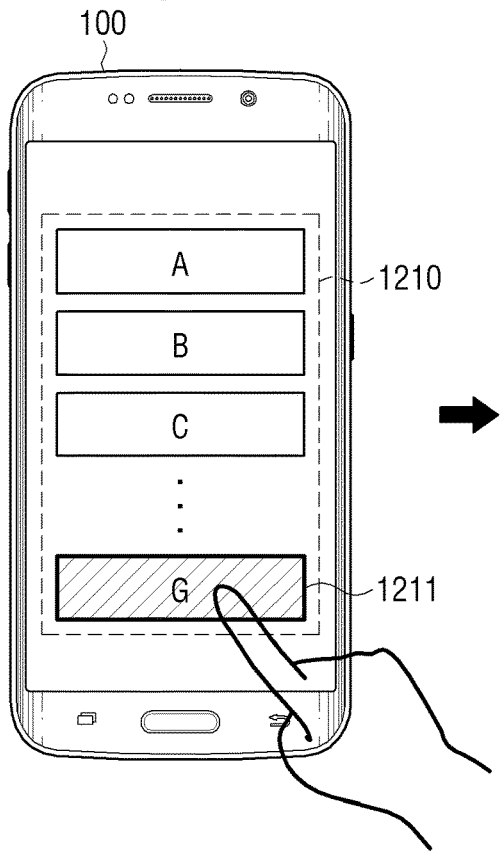
FIGS. 12A-12C are diagrams illustrating an example of registering IoT services in a proceeding situation based category in a portable terminal apparatus.
Figure 12B:
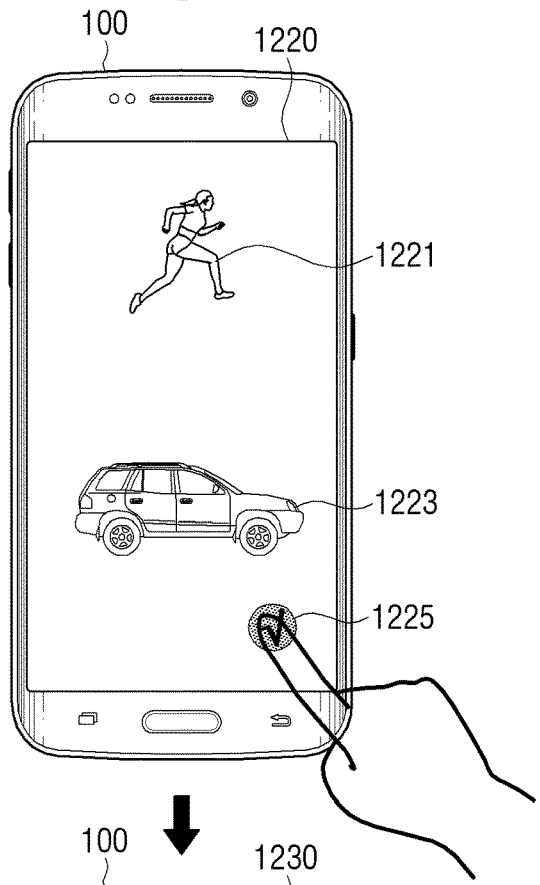
Figure 12C:
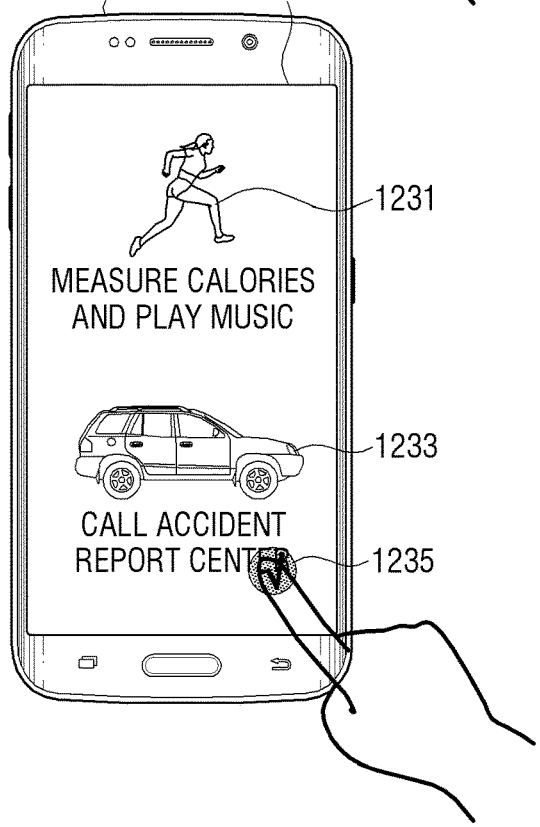

FIGS. 12A-12C are diagrams illustrating an example of registering an IoT service in a proceeding situation base category in a portable terminal apparatus.

As explained with reference to FIG. 4A, the portable terminal apparatus 100 displays a UI screen 310 that includes the registration icon 311 for registering an IoT service and the magic button icon 313 related to executing the IoT service.

For example, the UI screen may be one of a lock UI screen of the portable terminal apparatus 100, an execution UI screen of an application related to an IoT service, and a registration UI screen for registering the IoT service.

In response to a select command regarding the registration icon 311 for registering an IoT service being input with such a UI screen 310 displayed, as illustrated in FIG. 12A, the portable terminal apparatus 100 displays the category list 1210 that includes an icon corresponding to each of the plurality of categories predetermined regarding the IoT service. In response to the icon 1211 corresponding to category G being selected from among the plurality of categories included in the category list 1210, the portable terminal apparatus 100 displays the UI screen 1220 for registering an execution condition of category G base as illustrated in FIG. 12B.

For example, category G may be the user's proceeding situation base category. In response to a select command for the icon 1211 corresponding to the category classified as the user's proceeding situation base category being input, the portable terminal apparatus 100 may display the UI screen for registering an execution condition of the user's proceeding situation base.

With such a UI screen 1220 displayed, the portable terminal apparatus 100 may set a first and second execution condition by various movement situations of the user based on a user command. For example, according to a user command input, the portable terminal apparatus 100 may set a first execution condition, 'when the user is exercising', and a second execution condition, 'when the user is driving', based on the user command input.

In response to the first and second execution condition being set, the portable terminal apparatus 100 may display a first and second icon 1221, 1223 corresponding to the first and second execution condition. The portable terminal apparatus 100 receives input of an execution command corresponding to each of the first and second execution condition.

For example, as illustrated in FIG. 12C, with the UI screen 1230 for registering an execution command displayed, if the aforementioned first execution condition is satisfied, the user inputs an execution command for measuring calories and audio outputting. Accordingly, the portable terminal apparatus 100 may set an execution command for measuring calories and audio outputting based on the input execution command.

With the UI screen 1230 for registering an execution command displayed, if the aforementioned second execution condition is satisfied, the user inputs an execution command for automatic call to an accident report center (not illustrated) in the portable terminal apparatus 100 based on the input execution command. The portable terminal apparatus 100 may set an execution command for automatic call to the accident report center (not illustrated) based on the input execution command.

In response to an execution command corresponding to each of the first and second execution condition being set, the portable terminal apparatus 100 displays the first and second icon 1231, 1233 corresponding to each execution command set. In response to a select command regarding the registration icon 1235 displayed on the UI screen 1230 being input with the first and second icon 1231, 1233 corresponding to each execution command displayed, the portable terminal apparatus 100 may match the execution command set regarding each of the first and second execution condition pre-registered to each of the first to third execution condition and store the same.

In response to an execution condition and execution command that may be used in the user's proceeding situation base category being registered, the portable terminal apparatus 100 may provide an IoT service based on the movement situation.

In an example embodiment, in response to data communication being made with at least one of a vehicle black box (not illustrated) and vehicle navigation apparatus (not illustrated), the portable terminal apparatus 100 determines that the user is driving. In response to receiving event information related to an accident through the black box (not illustrated) in such a driving state, the portable terminal apparatus 100 determines that the first execution condition is satisfied. In response to determining that the first execution condition is satisfied, the portable terminal apparatus 100 may transmit an accident report related message to the accident report center (not illustrated) or perform an automatic telephone connection to a smart phone (not illustrated) of an officer in charge of accidents.

However, the present disclosure is not limited thereto, and thus in response to determining that the first execution condition is satisfied, the portable terminal apparatus 100 displays the magic button icon 313 related to executing an IoT service. In response to a select command regarding the displayed magic button icon 313 being input, the portable terminal apparatus 100 may transmit an accident report related message to the accident report center (not illustrated) or perform an automatic telephone connection to a smart phone (not illustrated) of an officer in charge of accidents.

In addition to the aforementioned various example embodiments, the portable terminal apparatus 100 may provide an IoT service in the current state base category. For example, the user at home may feel satisfied with the current state of the home, and set the current state as the execution condition. For example, the user may determine that the room temperature, lighting, and audio outputting state of the speaker (not illustrated) connected for Bluetooth communication with the portable terminal apparatus 100 are all satisfactory, and set the current state as the execution command.

In such a case, the user may select the current state base category from among the plurality of categories. The user inputs an execution condition for setting the current state as the execution command. For example, the user may input an execution condition, 'when the weather is good, and I'm home', as an execution condition. In response to the execution condition input by the user being registered in the current state base category, the portable terminal apparatus 100 may collect device state information from the plurality of peripheral devices (not illustrated) at home, and register all the collected information as the execution command corresponding to the execution condition.

In response to being satisfied with the execution condition registered in the current state base category, the portable terminal apparatus 100 may transmit the execution command registered in response to the execution condition to the plurality of peripheral devices (not illustrated) that perform operations based on the corresponding execution condition.

Operations for providing an IoT service in the portable terminal apparatus 100 according to the disclosure have been explained. Hereinafter, a service method for providing an IoT service in the portable terminal apparatus 100 of the disclosure will be explained in greater detail.

Figure 13:
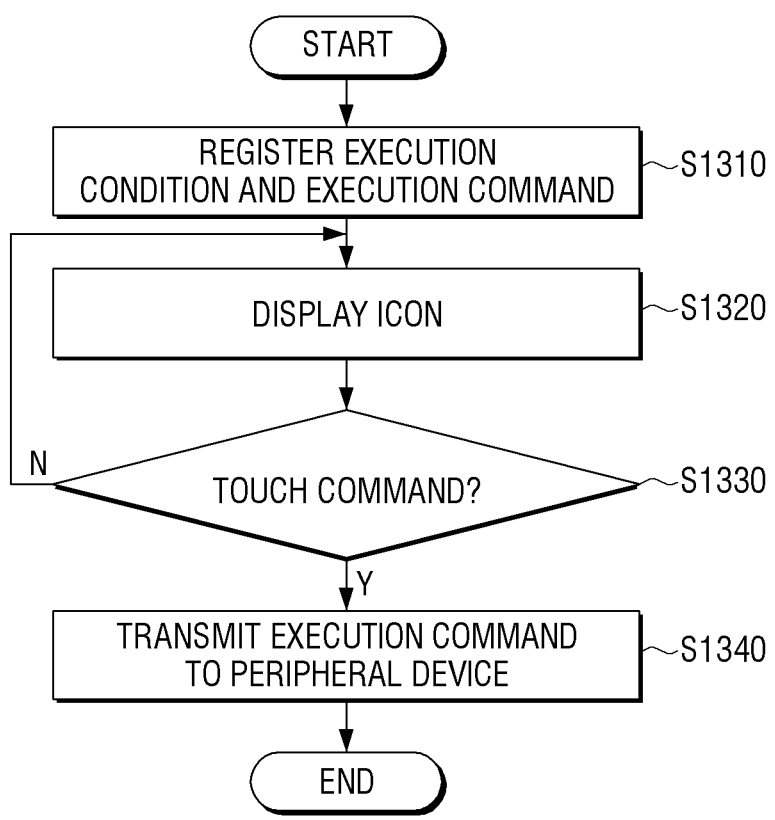
FIG. 13 is a flowchart illustrating an example service method for providing IoT services in a portable terminal apparatus.

FIG. 13 is a flowchart illustrating an example service method for providing an IoT service in a portable terminal apparatus.

As illustrated in FIG. 13, the portable terminal apparatus 100 registers at least one execution condition and execution command by predetermined category (S1310). For example, the predetermined category may include at least one of time base, location base, time and location base, peripheral device base, body information base and weather base category.

With at least one execution condition and execution command registered by category, the portable terminal apparatus 100 displays a magic button icon for an IoT service (S1320). In response to a select command regarding the magic button icon being input with such a magic button icon displayed, the portable terminal apparatus 100 transmits execution command corresponding to an execution condition of a point where the select command regarding the magic button icon is input to at least one peripheral device (S1330, S1340).

The portable terminal apparatus 100 may display the magic button icon being displayed regarding the IoT service on the lock screen. In response to a select command regarding the magic button icon being input, the portable terminal apparatus 100 performs user certification based on the input select command. For example, the user certification may be at least one of user fingerprint and touch input pattern.

In the case of performing user certification through the fingerprint, the portable terminal apparatus 100 may identify a fingerprint pattern of the user's finger that touched the control magic button icon, and perform user certification from a degree of similarity between the identified fingerprint pattern and a pre-stored fingerprint pattern.

In the case of performing user certification through a touch input pattern, the portable terminal apparatus 100 may track a movement path of the control magic button icon touched and moved by the user, and perform user certification from the degree of similarity between the pattern corresponding to the tracked movement path and the pre-registered touch input pattern. Such a technique of performing user certification from a fingerprint and touch input may be applied through a well-known user certification technique.

According to an additional aspect of the disclosure, in response to a predetermined user command regarding the magic button icon being input, the portable terminal apparatus 100 may display a sub icon corresponding to at least one execution condition executable at a point where the user command is input. In such a case, in response to a select command regarding the displayed sub icon being input, the portable terminal apparatus 100 may transmit an execution command corresponding to the execution condition at the point where the select command regarding the sub icon is input to at least one peripheral device.

Hereinafter, a method for registering at least one execution condition and execution command predetermined by category in the portable terminal apparatus 100 will be explained in greater detail.

Figure 14:
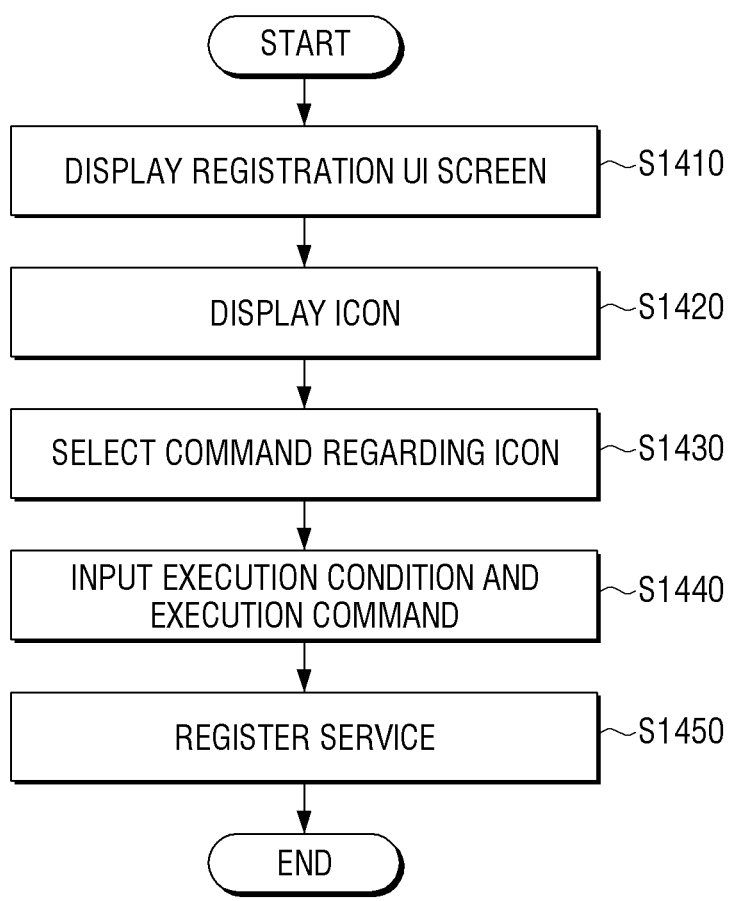
FIG. 14 is a flowchart illustrating an example method for registering IoT services in a portable terminal apparatus.

FIG. 14 is a flowchart illustrating an example method for registering an IoT service in a portable terminal apparatus.

As illustrated in FIG. 14, the portable terminal apparatus 100 displays a registration UI screen for registering an IoT service according to a user command (S1410). With such a registration UI screen displayed, the portable terminal apparatus 100 displays the UI screen that includes an icon corresponding to each of a plurality of categories predetermined according to the user command (S1420).

The portable terminal apparatus 100 receives a select command regarding one of the plurality of icons displayed on the UI screen, and receives an execution condition and execution command for performing an IoT service in the category corresponding to the selected icon (S1430, S1440). The portable terminal apparatus 100 registers the execution condition and execution command pre-input in the category corresponding to the selected icon (S1450).

Figure 15:
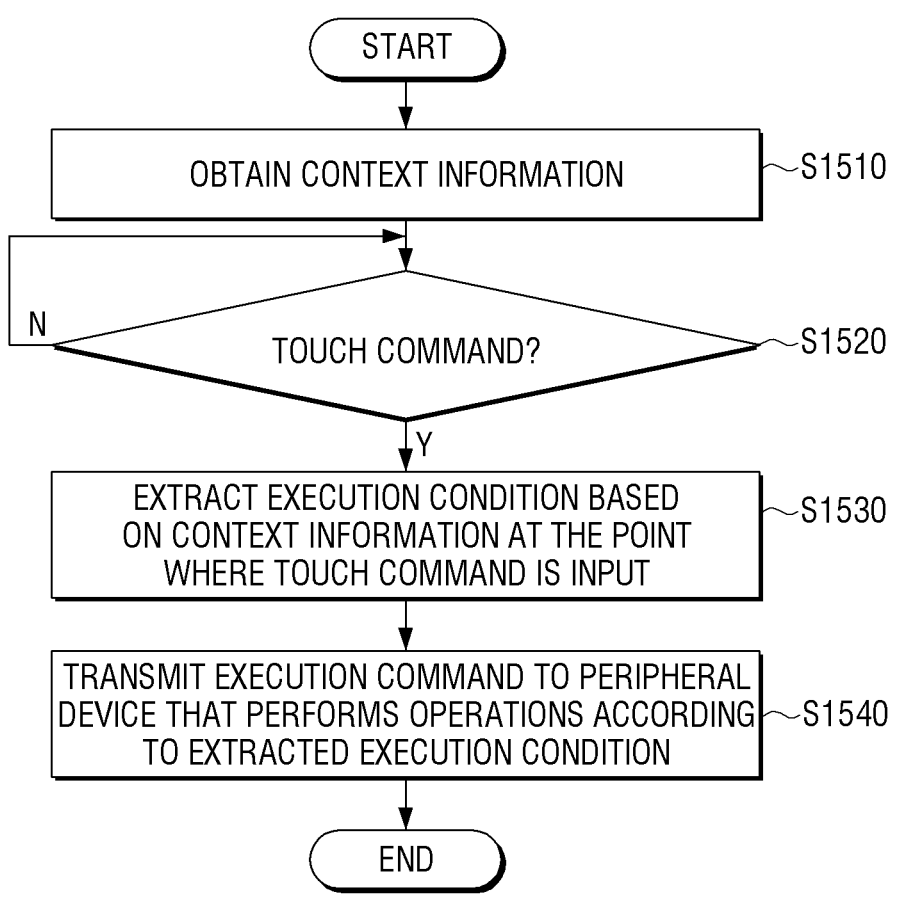
FIG. 15 is a first flowchart illustrating an example method for transmitting an execution command according to an execution condition for IoT services in a portable terminal apparatus.

FIG. 15 is a first flowchart illustrating an example method for transmitting an execution command according to an execution condition for an IoT service in a portable terminal apparatus.

As illustrated in FIG. 15, the portable terminal apparatus 100 obtains context information before a select command regarding a magic button icon related to executing an IoT service is input (S1510). For example, the context information may include at least one of location information of the portable terminal apparatus 100, information on state of communication with at least one peripheral device, body information and weather information.

In response to a select command regarding the magic button icon related to executing an IoT service being input, the portable terminal apparatus obtains context information at the point where the select command regarding the magic button icon is input from among the pre-obtained context information, and extracts an execution condition based on the obtained context information (S1520, S1530).

In response to at least one execution condition being extracted based on such context information, the portable terminal apparatus 100 transmits an execution command corresponding to the extracted execution condition to a peripheral device that performs operations of the extracted execution condition (S1540).

Figure 16:
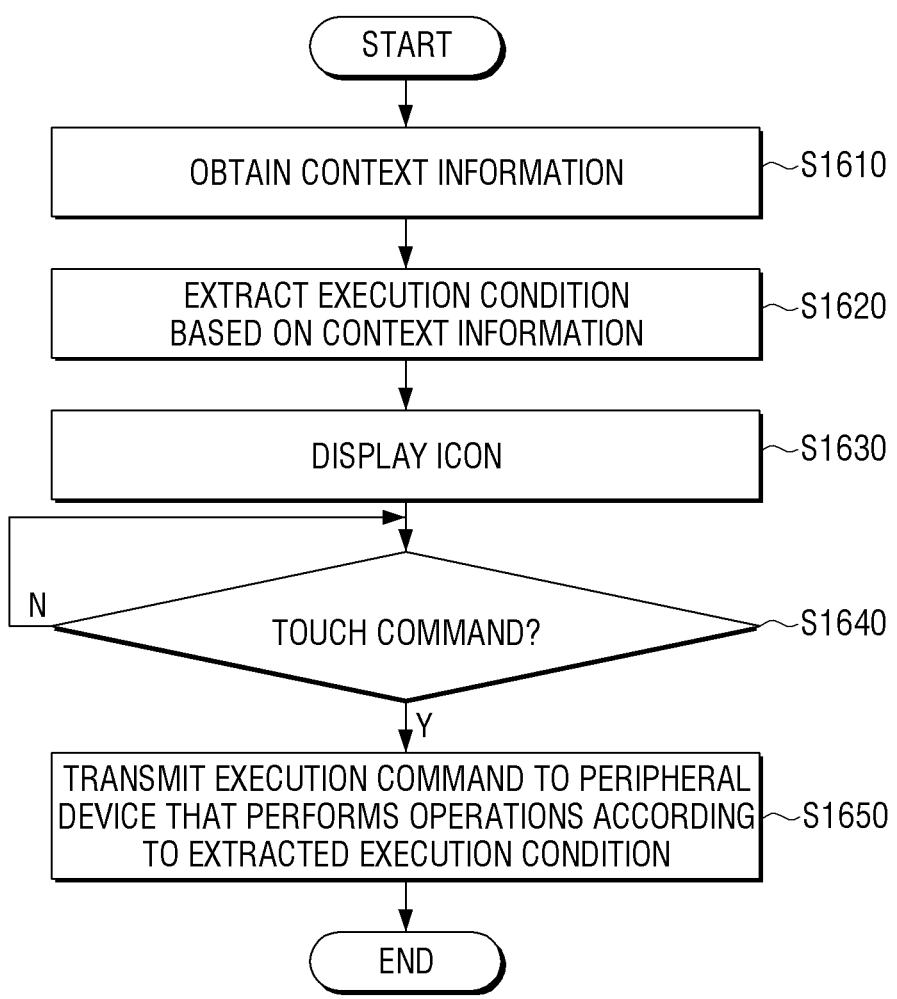
FIG. 16 is a second flowchart illustrating an example method for transmitting an execution command according to an execution condition for IoT services in a portable terminal apparatus.

FIG. 16 is a second flowchart illustrating an example method for transmitting an execution command according to an execution condition for an IoT service in a portable terminal apparatus.

As illustrated in FIG. 16, the portable terminal apparatus 100 obtains context information from before a select command regarding a magic button icon related to executing an IoT service is input (S1610). For example, the context information may include at least one of current time information, location information of the portable terminal apparatus 100, information on state of communication with at least one peripheral device, body information and weather information.

In response to the context information being obtained, the portable terminal apparatus 100 extracts at least one execution condition from among the execution condition registered by category using the obtained context information (S1620). In response to at least one execution condition being extracted, the portable terminal apparatus 100 displays the magic button icon for executing an IoT service (S1630). In response to a select command regarding the displayed magic button icon being input, the portable terminal apparatus 100 transmits an execution command corresponding to the execution condition to a peripheral device that performs an operation of the pre-extracted execution condition (S1640, S1650).

As mentioned above, as the magic button icon is displayed only when at least one execution condition related to the context information collected in real time from among the pre-registered plurality of execution conditions is extracted, the user may intuitively identify whether or not an IoT service may be used at the current situation.

The service provision method for providing an IoT service in the aforementioned portable terminal apparatus 100 may be realized as at least one execution program for providing the aforementioned IoT service, and such an execution program may be stored in a non-transitory computer readable medium.

A non-transitory computer readable medium refers to a computer readable medium that stores data semi-permanently. For example, the aforementioned programs may be stored in various types of record media that may be read in a terminal such as a RAM (Random Access Memory), flash memory, ROM (Read Only Memory), EPROM (Erasable Programmable ROM), EEPROM (Electronically Erasable and Programmable ROM), register, hard disk, removable disk, memory card, USB memory, and CD-ROM and the like.

So far, explanation was made of the disclosure based on example embodiments.

Although a few example embodiments of the disclosure have been illustrated and described, it would be appreciated by those skilled in the art that changes may be made in the example embodiments without departing from the principles and spirit of the disclosure, the scope of which is defined in the claims and their equivalents.

What is claimed is:

1. A method for controlling a portable terminal apparatus, the method comprising:
    registering at least one execution condition and at least one execution command corresponding to the at least one execution condition for at least one peripheral device, in the portable terminal apparatus by category, wherein the at least one execution condition is a condition to be satisfied for the at least one execution command to be executed by the at least one peripheral device for performing a function in the at least one peripheral device, and the category of the at least one execution condition is at least one of time based, location based, time and location based, weather based;
    obtaining context information that includes at least one of current time information at a location of the portable terminal apparatus, location information of the portable terminal apparatus, information on communication with the at least one peripheral device, and weather information;
    extracting an execution condition from among the registered at least one execution condition based on the obtained context information;
    obtaining an execution command corresponding to the extracted execution condition from among the registered at least one execution command;
    displaying an icon corresponding to the obtained execution command on the portable terminal apparatus; and
    based on the displayed icon being selected by a user input, transmitting, to the at least one peripheral device, the obtained execution command so that the at least one peripheral device can perform the transmitted execution command.

2. The method according to claim 1,
    wherein the registering comprises registering the at least one execution condition by category, wherein the extracting comprises extracting the execution condition among the at least one execution condition registered by category based on the context information, and transmitting the obtained execution command to the at least one peripheral device that performs operations based on the extracted execution condition.

3. The method according to claim 1,
wherein the registering comprises registering the at least one execution condition by category,
wherein the extracting comprises extracting at least one execution condition of the at least one execution condition registered by category using the context information,
wherein the displaying includes displaying the icon in response to the at least one execution condition being extracted.

4. The method according to claim 1,
wherein the registering comprises registering a plurality of execution conditions by category, and
wherein the transmitting comprises, in response to a first execution condition, from among the plurality of execution conditions registered in a first category, being extracted, transmitting a first execution command corresponding to the first execution condition to the at least one peripheral device that performs operation based on the first execution condition, and
in response to the first execution condition and a second execution condition, from among the plurality of execution conditions registered in the first category, being extracted, transmitting each execution command corresponding to the each first and second execution condition to the at least one peripheral device that performs operations based on the first and second execution condition.

5. The method according to claim 1,
wherein the transmitting comprises, in response to a first execution condition registered in a first category and a second execution condition registered in a second category being extracted, transmitting each execution command corresponding to the each first and second execution condition to the at least one peripheral device that performs operations based on each of the first and second execution condition extracted in the first and second category.

6. The method according to claim 1,
wherein the icon is displayed on a lock screen of the portable terminal apparatus.

7. The method according to claim 1,
further comprising, in response to a predetermined command regarding the icon being input, displaying a sub icon corresponding to the extracted execution condition, and
the transmitting comprises, in response to a select command regarding the sub icon displayed being input, transmitting the obtained execution command corresponding to the extracted execution condition to the at least one peripheral device.

8. The method according to claim 1,
further comprising, in response to a select command regarding the icon being input, performing a user certification based on the select command,
wherein the user certification is at least one of a fingerprint and touch input pattern.

9. The method according to claim 1,
wherein the registering comprises:
displaying a registration UI screen for registering an IoT service based on a received command;
receiving an input of a select command regarding at least one of an icon corresponding to each category included in the registration UI screen;
in response to the at least one icon being selected, receiving an input of an execution condition and an execution command; and
registering the input execution condition and execution command in a category corresponding to the selected icon.

10. A portable terminal apparatus comprising:
communication circuitry configured to perform data communication with at least one peripheral device;
a storage;
a display;
input circuitry; and
a processing circuitry configured to:
control the storage to register at least one execution condition and at least one execution command corresponding to the at least one execution condition for at least one peripheral device, in the portable terminal apparatus by category, wherein the at least one execution condition is a condition to be satisfied for the at least one execution command to be executed by the at least one peripheral device for performing a function in the at least one peripheral device, and the category of the at least one execution condition is at least one of time based, location based, time and location based, weather based;
obtain context information that includes at least one of current time information at a location of the portable terminal apparatus, location information of the portable terminal apparatus, information on communication with the at least one peripheral device, and weather information;
extract an execution condition from among the registered at least one execution condition based on the obtained context information;
obtain an execution command corresponding to the extracted execution condition from among the registered at least one execution command;
control the display to display an icon corresponding to the obtained execution command on the portable terminal apparatus; and
based on the displayed icon being selected by a user input through the input circuitry, control the communication circuitry to transmit, to the at least one peripheral device, the obtained execution command so that the at least one peripheral device can perform the transmitted execution command.

11. The apparatus according to claim 10,
wherein the processing circuitry is configured to:
control the storage to register the at least one execution condition by category,
extract the execution condition among the at least one execution condition registered by category based on the context information, and
control the communication circuitry to transmit the obtained execution command to the at least one peripheral device that is to perform operations based on the extracted execution condition.

12. The apparatus according to claim 10,
wherein the processing circuitry is configured to:
control the storage to register the at least one execution condition by category,
extract at least one execution condition of the at least one execution condition registered by category using the context information, and
control the display to display the icon in response to the at least one execution condition being extracted.

13. The apparatus according to claim 10,
wherein the processing circuitry is configured to:
control the storage to register a plurality of execution conditions by category,
in response to a first execution condition from among the plurality of execution conditions registered in a first category being extracted, control the communication circuitry to transmit a first execution command corresponding to the first execution condition to the at least one a peripheral device that is to perform operation based on the first execution condition, and
in response to the first execution condition and second execution condition from among the plurality of execution conditions registered in the first category being extracted, control the communication circuitry to transmit each execution command corresponding to the each first and second execution condition to the at least one peripheral device that is to perform operations based on the first and second execution condition.

14. The apparatus according to claim 10,
wherein the processing circuitry is configured to:
in response to a first execution condition registered in a first category and a second execution condition registered in a second category being extracted, control the communication circuitry to transmit each execution command corresponding to the each first and second execution condition to the at least one a peripheral device that is to perform operations based on the first and second execution condition extracted in the first and second category.

15. The apparatus according to claim 10,
wherein the icon is displayed on a lock screen of the portable terminal apparatus.

16. The apparatus according to claim 10,
wherein the processing circuitry is configured to:
in response to a predetermined command regarding the icon being input through the input circuitry, control the display to display a sub icon corresponding to the extracted execution condition, and
in response to a select command regarding the sub icon displayed being input through the input circuitry, control the communication circuitry to transmit the obtained execution command corresponding to the extracted execution condition to the at least one peripheral device.

17. The apparatus according to claim 10,
wherein the processing circuitry is configured to:
in response to a select command regarding the icon being input through the input circuitry, perform a user certification based on the select command, and
wherein the user certification is at least one of a fingerprint and touch input pattern.

18. The apparatus according to claim 10,
wherein the processing circuitry is configured to:
display a registration UI screen for registering an IoT service based on a received command;
receive an input of a select command regarding at least one of an icon corresponding to each category included in the registration UI screen;
in response to the at least one icon being selected though the input circuitry, receive an input of an execution condition and an execution command; and
control the storage to register the input execution condition and the input execution command in a category corresponding to the selected icon.

* * * * *